United States Patent
Smith

(10) Patent No.: US 6,568,634 B2
(45) Date of Patent: *May 27, 2003

(54) WING-DRIVE MECHANISM AND VEHICLE EMPLOYING SAME

(76) Inventor: Michael J. C. Smith, 2131 Saint David Dr., Bettendorf, IA (US) 52722

( * ) Notice: Subject to any disclaimer, the term of this patent is extended or adjusted under 35 U.S.C. 154(b) by 0 days.

This patent is subject to a terminal disclaimer.

(21) Appl. No.: 09/793,333

(22) Filed: Feb. 26, 2001

(65) Prior Publication Data

US 2001/0019088 A1 Sep. 6, 2001

Related U.S. Application Data

(63) Continuation-in-part of application No. 09/385,326, filed on Aug. 30, 1999, now Pat. No. 6,206,324.
(60) Provisional application No. 60/185,031, filed on Feb. 25, 2000.

(51) Int. Cl.[7] .................................................. B64C 33/02
(52) U.S. Cl. ........................................... 244/72; 244/22
(58) Field of Search ............................ 244/11, 22, 72; 446/39, 313; 490/32, 21, 13; 416/74, 75, 83

(56) References Cited

U.S. PATENT DOCUMENTS 1,980,002 A * 11/1934 Savidge ....................... 244/72

* cited by examiner

Primary Examiner—Galen L. Barefoot
(74) Attorney, Agent, or Firm—Gary C Cohn PLLC

(57) ABSTRACT

A wing-drive mechanism is described that permits, with proper control, movement of a wing about multiple wing trajectories. The wing-drive is capable of independent movement about three rotational degrees of movement; movement about a flap axis is independent of movement about a yaw axis, and both are independent of changes in the pitch of the wing. Methods of controlling the wing-drive mechanism to affect a desired wing trajectory include the use of a non-linear automated controller that generates input signals to the wing-drive mechanism by comparing actual and desired wing trajectories in real time. Specification of wing trajectories is preferably also accomplished in real time using an automated trajectory specification system, which can include a fuzzy logic processor or a neural network. A vehicle that derives controlled motion as a whole from the wing-drive mechanism is also disclosed.

26 Claims, 9 Drawing Sheets

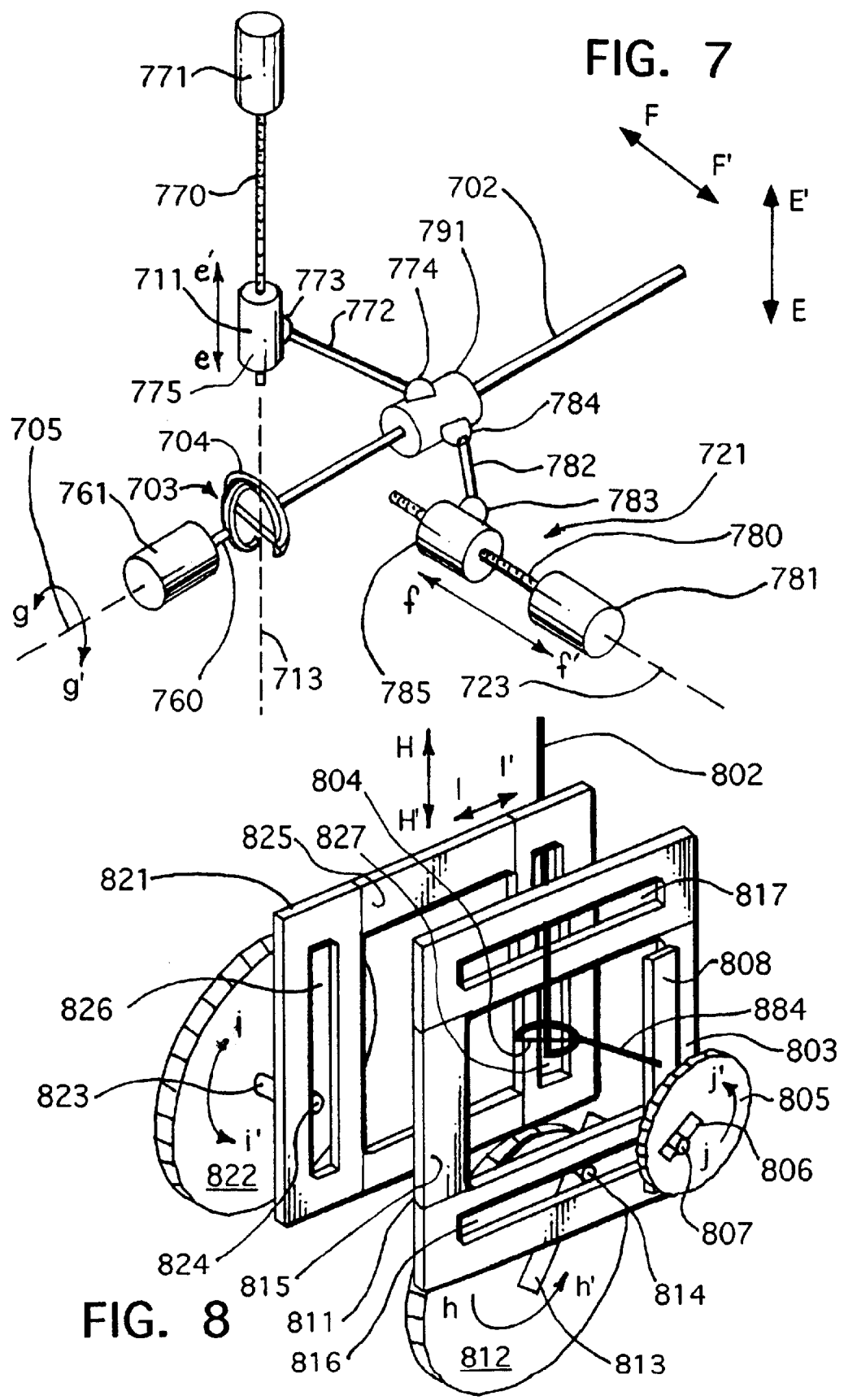

WING-DRIVE MECHANISM AND VEHICLE EMPLOYING SAME

CROSS-REFERENCE TO RELATED APPLICATION

This application is a continuation-in-part of application Ser. No. 09/385,326, filed Aug. 30, 1999, now U.S. Pat. No. 6,206,324. This application claims benefit of provisional application Ser. No. 60/185,031, filed Feb. 25, 2000, and of PCT application PCT/US00/23544, filed Aug. 28, 2000.

BACKGROUND OF THE INVENTION

This invention relates to vehicles that derive motion from one or more flapping wings.

Since the advent of controlled heavier-than-air flight in the early 1900's, development of aircraft has focussed primarily on fixed-wing and rotary wing technologies. Fixed-wing technologies are typified by commercial, military and pleasure airplanes, in which thrust is generated by a propeller or jet engine and the forward movement of an airfoil through the atmosphere creates lift. Rotary-wing technologies are employed in helicopters, in which lift is generated by pushing air downward with rotating rotor blades. Each of these technologies has its advantages and limitations.

Fixed-wing technologies, for example, permit very high forward velocities and maneuverability. However, both lift and maneuverability depend on the forward motion of the aircraft. Vertical short take-offs or landings (VSTOL), hovering and other maneuvers cannot be accomplished using fixed-wing technology alone. Similarly, turns cannot be executed without rolling the fuselage, and very sharp angle turns cannot be accomplished. Rotary-wing technologies offer improved VSTOL and hovering ability, but their forward and sideways velocities usually are limited, as is their ability to turn. In addition, rotary-wing aircraft often respond poorly to wind gusts.

Hybridized vehicles incorporate fixed-wing and rotary wing technologies to create a combined lift-thrust force. These vehicles have shown limited improvements in maneuverability and versatility compared to fixed-wing and rotary wing vehicles.

A third approach to heavier-than-air flight employs flapping wings to generate a combined lift-thrust force. In principle, flapping wing technology offers the possibility of creating versatile flight vehicles that can combine and in some cases exceed the performance advantages of fixed-wing and rotary-wing technologies. In particular, flapping wing technology offers the possibility of providing improved maneuverability compared to even rotary-wing technologies. Vehicles employing flapping wing technologies are referred to as "ornithopters".

Unfortunately, very few ornithopters have succeeded in flying. In 1929, Lippisch developed a human-powered ornithopter that achieved non-sustained flight. In 1986, Mac-Cready et al. developed an ornithopter modeled on a pterosaur, an extinct flying reptile. That ornithopter was winch launched and could not sustain flight for an extended duration. More recently, Harris and DeLaurier developed an ornithopter that was capable of sustained flight. In addition, various toys have been developed that employ flapping wing technology to fly, including that described in U.S. Pat. No. 4,729,728 to Van Ruymbeke.

Unfortunately, even those previous ornithopters that were capable of flight were very limited in their maneuverability. These ornithopters operated by flapping wings only in a single trajectory, i.e., in an up and down motion. Thus, the aerodynamic force developed by the flapping wings over the course of a series of "beats" was fixed in a fixed (relative to the vehicle), substantially vertical plane. To develop lift, these ornithopters mimicked conventional fixed wing aircraft in that in all cases lift was achieved by creating airflow past an airfoil due to the forward motion of the vehicle as a whole. Thus, these ornithopters suffered from the same maneuverability limitations as conventional fixed-wing aircraft.

In an analogous way, conventional and submersible watercraft, spacecraft and satellites also are limited in their maneuverability due to the design of their propulsion systems.

It would be desirable to provide a wing-drive mechanism, that can affect more than one wing trajectory, thereby generating a force vector over the course of a "beat" or series of "beats" which has an arbitrary but predetermined and changeable magnitude and/or direction. It would also be desirable to provide a method of controlling a wing-drive mechanism that can affect more than one wing trajectories. It would further be desirable to provide a vehicle having at least one flapping drive wing that can affect multiple wing trajectories. It would further be desirable to provide a method for improved control of the motion of an ornithopter or other vehicle as a whole.

BRIEF DESCRIPTION OF THE DRAWINGS

FIG. 7 illustrates a third embodiment of the wing-drive mechanism of this invention.

FIG. 8 illustrates a fourth embodiment of the wing-drive mechanism of this invention.

SUMMARY OF THE INVENTION

Figure 1:
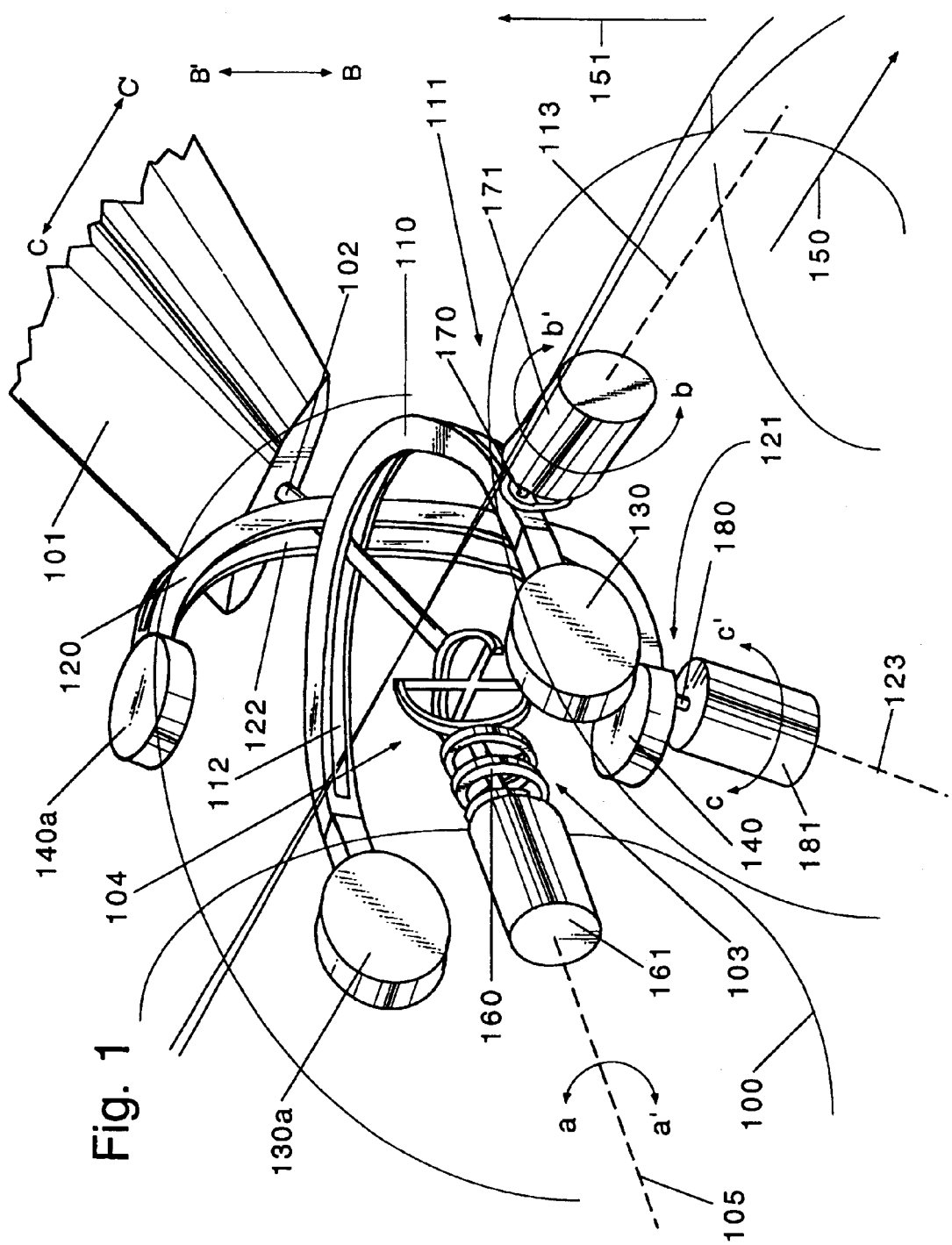
FIG. 1 is an overhead view of an embodiment of the wing-drive mechanism of this invention.

In one aspect, this invention is a wing-drive mechanism for a vehicle having a fuselage, comprising
 a) a drive wing having an adjustable pitch relative to said fuselage and being moveable relative to said fuselage about yaw and flap axes;

b) a first axis drive mechanism for moving said drive wing about said flap axis in response to a first movement input signal, c) a second axis drive mechanism for moving said drive wing about said yaw axis in response to a second movement input signal, wherein said second axis drive mechanism operates independently of said first axis drive mechanism and d) a third axis drive mechanism for adjusting the pitch of said drive wing in response to a third movement input signal, wherein said third axis drive mechanism operates independently of said first and second axis drive mechanisms.

Because the wing-drive mechanism of this invention is capable of independent movement in three degrees of rotation, it can with proper control be operated to move over multiple trajectories. Multiple, arbitrary wing trajectories can be produced by varying the relative operation of the three axis drive mechanisms, thereby permitting the drive-wing to generate, over the course of a "beat" or series of beats, a net force vector that can have varying magnitudes and directions relative to the orientation of the fuselage in space.

The wing-drive mechanism of this invention also allows for the development of vehicles having two or more independently operated drive wings; i.e. the trajectory of one drive wing can be specified arbitrarily with respect to the trajectory of another drive wing. By operating independently in this fashion, the forces generated by each drive wing can be combined in various ways to maneuver the vehicle. As discussed below, the wing-drive mechanism of this invention most preferably operates independently of the orientation of the fuselage in inertial space, i.e. the ability of the wing-drive mechanism to affect a certain trajectory relative to an inertial frame of reference is not conditioned on the vehicle occupying a unique orientation in space. This can provide yet further refinements in maneuverability and control.

Unless the context requires a narrow meaning, the terms "wing" or "drive wing" are used herein broadly to mean any wing, aileron, stabilizer, rudder, paddle or other propulsion and/or steering device that is moved through a trajectory by the wing-drive mechanism of the invention. "Fuselage" is used herein as shorthand for any host body to which the wing-drive mechanism is affixed.

In a second aspect, this invention is a vehicle that derives motion from at least one wing-drive mechanism attached to a fuselage, said wing-drive mechanism comprising a) a drive wing having an adjustable pitch relative to said fuselage and being moveable relative to said fuselage about yaw and flap axes;

b) a first axis drive mechanism for moving said drive wing about said flap axis in response to a first movement input signal, c) a second axis drive mechanism for moving said drive wing about said yaw axis in response to a second movement input signal, wherein said second axis drive mechanism operates independently of said first axis drive mechanism and d) a third axis drive mechanism for adjusting the pitch of said drive wing in response to a third movement input signal, wherein said third axis drive mechanism operates independently of said first and second axis drive mechanisms.

In a third aspect, this invention is a method of controlling a wing-drive mechanism of the first aspect, comprising a) inputting a desired drive wing trajectory into a controller including a computer that is programmed to calculate first, second and third movement input signals in real time using a non-linear controlling function that relates said desired drive wing trajectory to torques to be applied by each of said first, second and third axis drive mechanisms, b) using said controller, generating said first, second and third movement input signals in real time, and c) transmitting said first, second and third movement input signals to said first, second and third axis drive mechanisms, respectively, whereby said first, second and third axis drive mechanisms affect movement of the drive wing in the desired trajectory in response to said first, second and third movement input signals.

In a fourth aspect, this invention is another method of controlling the wing-drive mechanism of the first aspect, comprising a) developing two or more sets of coordinated movement input signals, each such set including a first, second and third movement input signal, each such set corresponding to a specific drive wing trajectory;

b) recording each set of first, second and third movement input signals, c) inputting a desired drive wing trajectory into a controller that is adapted to access said recorded sets of drive wing trajectories and generate a set of first, second and third movement input signals that correspond to the desired drive wing trajectory and d) using said controller, generating and transmitting a set of first, second and third movement input signals corresponding to said desired drive wing trajectory to said first, second and third axis drive mechanisms, respectively.

In a fifth aspect, this invention is a method of controlling a deformable drive wing having one or more piezoelectric actuators that when operated impart a trajectory to the drive wing through periodic deformation of the drive wing, comprising a) inputting a desired drive wing trajectory into a controller including a computer that is programmed to calculate movement input signals for each actuator on said deformable drive wing in real time using a non-linear controlling function that relates said desired drive wing trajectory to deformations created by the action of each of said piezoelectric actuators, b) using said controller, generating movement input signals for each of said piezoelectric actuators in real time, and c) transmitting said movement input signals to said piezoelectric actuators such that the actuators affect movement of the drive wing in the desired trajectory in response to said movement input signals.

DETAILED DESCRIPTION OF THE INVENTION

In this invention, a vehicle has one or more movable drive wings that are attached directly or indirectly to a fuselage. The vehicle can be, for example, a flying vehicle such as an ornithopter, a watercraft such as a submersible or a boat, a spacecraft or a satellite. As used herein, the term "fuselage" refers to a structure to which the drive wings are attached, and in relation to which the drive wings move during a beat cycle. The "fuselage" can have any arbitrary shape, size and orientation, and may optionally include one or more platforms or enclosed spaces for carrying operational systems, cargo and/or passengers. Wings and drive wings for flying vehicles are of particular interest.

In the context of this application, "drive wing" means an appendage attached directly or indirectly to the fuselage of the vehicle, and which moves relative to the fuselage to create a force that imparts motion or navigational control (or both) to the vehicle in a predetermined direction. In the case of an aircraft, the drive wing can take the form of, e.g., a fixed wing, rotary wing, airfoil, rudder, stabilizer, elevator, aileron, leg, or landing gear. In the case of a watercraft, the drive wing can take the form of, e.g., a rudder, propulsion device, tail (analogous to the tail of a fish or aquatic mammal) or fin (again analogous to a fish or aquatic mammal). In the case of a spacecraft or satellite, the drive wing can be adapted to provide an inertial control system, or to provide mass balancing.

The drive wing(s) move(s) relative to the fuselage in a periodic manner to produce a force over the course of a beat cycle or series of beat cycles. A "beat cycle" describes the periodic movement of a drive wing from an initial starting orientation relative to the fuselage, through a trajectory relative to the fuselage and returning to the initial starting orientation, whereupon a new beat cycle begins. The "trajectory" of a drive wing is the entire course of movement that is undertaken by the drive wing during the course of a beat cycle. The "trajectory" includes the movement of the drive wing in at least three rotational degrees of freedom, i.e. about flap and yaw axes, and through changes of pitch. A drive wing trajectory can be described in relation to the fuselage or an inertial frame of reference.

Figure 3:
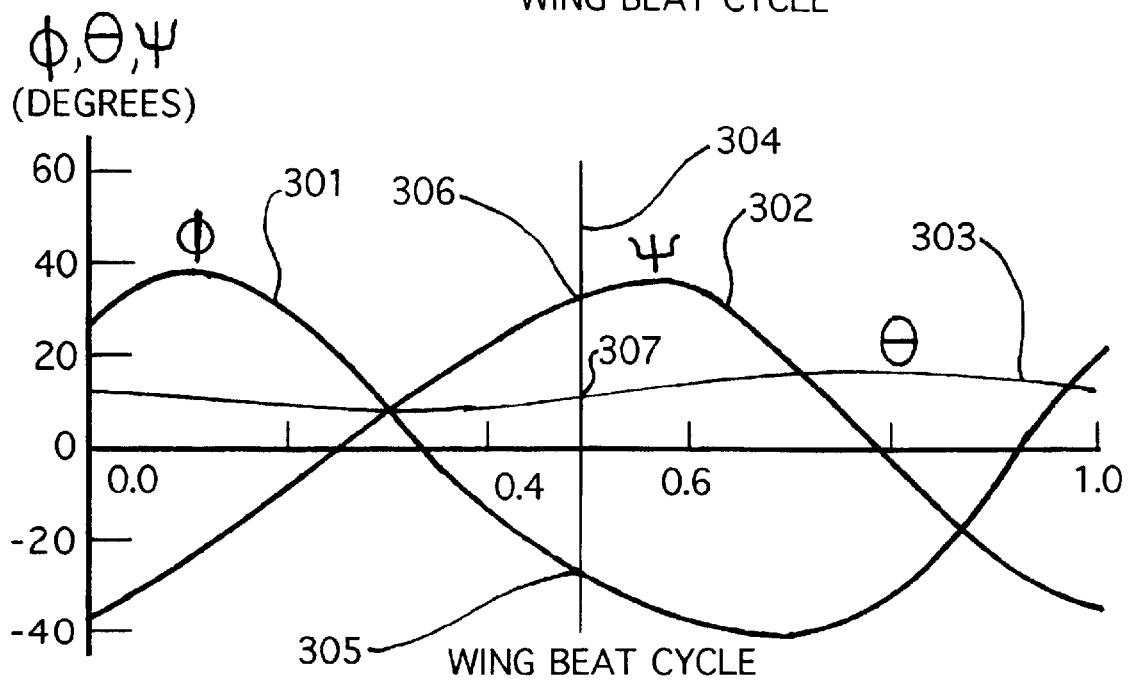
FIG. 3 is a graphical representation of an example of how a drive wing can move through a beat cycle.

FIG. 3 illustrates how a wing trajectory can be expressed in terms of motion about a flap axis (curve 301) and a yaw axis (curve 302) and changes in pitch (curve 303) over the course of a single beat. The wing trajectory illustrated in FIG. 3 simulates naturally occurring wing movement related to an analysis of a sphingid moth. All angles are expressed in terms of Euler angles, which relate wing motions to a preselected coordinate system based on orientation of the body (in this case, a moth) as a whole. Methods for relating Euler angles to wing motions are described in "Simulating Flapping Insect Wings Using an Aerodynamic Panel Method: Towards the Development of Flapping-Wing Technology", Ph.D. Thesis of M. J. C. Smith, Purdue University (1995), incorporated herein by reference. However, any convenient method for representing the orientation angles can be used, such as those methods described in Wakeling and Ellington, "Dragonfly Flight I. Gliding Flights and Steady-State Aerodynamic Forces", J. Experimental Biology, V. 200, pp. 543–556 (1997); Wakeling and Ellington, "Dragonfly Flight II. Velocities, Accelerations and Kinematics of Flapping Flight", J. Experimental Biology, V. 200, pp. 557–582 (1997); Wakeling and Ellington, "Dragonfly Flight III. Quasi-steady Lift and Power Requirements", J. Experimental Biology, V. 200, pp. 583–600 (1997). Other methods of representing relative rotational angles (besides Euler angles and the aforementioned described by Wakeling and Ellington), include Bryant angles, Euler parameters, Rodrigues parameters and Quaternions. All these forms of representation may relate to both the relative angles between the wings and the host body, the host body and the earth, as well as to relative angles of portions of the wings to each other. Vertical line 304 intersects lines 301, 302 and 303 at points 305, 306 and 307, respectively, and indicates the values of the Euler angles at sampling time $t_s$. Points 305, 306 and 307 together designate a desired wing position at time $t_s$. The first and second derivatives of lines 301, 302 and 303 at time $t_s$ represent angular velocities and accelerations of the wing in terms of Euler angles. Together these derivatives designate the desired angular wing velocity and acceleration at time $t_s$.

The shape and dimensions of the drive wing will of course be a matter of design choice, and the particular shape and dimension are not critical to the invention. All that is necessary is that the drive wing be shaped in a way that it can be moved over a trajectory, over the course of a beat cycle or a series of beat cycles, such that it generates a net force in a predetermined direction. This is most easily achieved by designing the drive wing with an average width significantly greater than its average thickness, so that the force exerted by the moving drive wing at a given point in its trajectory can be increased or decreased by varying the pitch of the drive wing. For flying vehicles, it is not necessary that the drive wing be shaped so as to function as an airfoil, although it is optionally shaped in such a manner.

In practice, the particular size, shape, construction and weight of the drive wing(s) will be selected in conjunction with many other design considerations, including, notably, the size, shape, orientation and weight of the vehicle as a whole, the design of other drive wings, the position of the drive wing relative to the fuselage and other drive wings and structural features, power requirements and availability, and desired performance characteristics of the vehicle as a whole. The development of suitable drive wing designs is advantageously done together with the development of accompanying drive wing trajectories. Concerning the materials of construction of any vehicle as a whole, the choice of materials will include but may not be limited to: fiber-glass reinforced plastic, carbon-reinforced plastic and/or kevlar for the fuselage, wings, wing drive components and spars, and titanium, titanium tubing, and/or metal impregnated ceramics and/or metal impregnated fiber reinforced plastics for the wing drive components (including the wing-spar).

For purposes of evaluating suitable drive wing designs for a particular flying vehicle in connection with suitable drive wing trajectories, the net force that is performed by a beating drive wing over a beat cycle or series of beat cycles can be ascertained empirically or estimated using one or more modeling techniques as are known in the art. Among the mathematical models that are useful for estimating the magnitude and direction of the aerodynamic force created by a wing over a beat cycle are those described in the Ph.D. Thesis of Smith, cited above; Smith, "Simulating Moth Wing Aerodynamics: Towards the Development of Flapping-Wing Technology", AIAA Journal 34:7, pp. 1348–1355 (1996); Smith et al., "The Advantages of an Unsteady Panel Method in Modeling the Aerodynamic Forces on Rigid Flapping Wings", J. Experimental Biology 199, 1073–1083 (1996); Smith, Leading-Edge Effects on Moth Wing Aerodynamics: Towards the Development of Flapping-Wing Technology, 14th AIAA Applied Aerodynamics Conference (1996); Liu et al., "A computational fluid dynamic study of hawkmoth hovering", J. Experimental Biology, Vol. 201, pp. 461–477 (1968); Vest and Katz, "Unsteady Aerodynamic Model of Flapping Wings", AIAA Journal, 34:7, pp. 1435–1440 (1996); Tuncer and Platzer, "Thrust Generation due to Airfoil Flapping", AIAA Journal, 34:2, pp. 324–331 (1996); and Tuncer et al., "Computational Analysis of Flapping Airfoil Aerodynamics", Advances in Computations Methods in Fluid Dynamics, American Society of Mechanical Engineers, New York, FED-Vol. 196, pp. 9–18 (1994), all incorporated herein by reference.

Empirical methods for measuring the aerodynamic force created by a single flapping wing or a plurality of flapping wings in combination are described, for example, by Reavis and Luttges, "Aerodynamic Forces Produced by a Dragonfly", AIAA 888–0330 (1988); Saharon and Luttges, "Dragonfly Unsteady Aerodynamics-the Role of the Wing Phase Relations in Controlling the Produced Flows", AIAA 89-0832 (1989); and the Wakeling and Ellington articles mentioned above.

For any particular drive wing design for a flying vehicle, relationships between specific drive wing trajectories and resultant aerodynamic and inertial forces can be established empirically or through modeling techniques, or combinations of both. These relationships advantageously are used to develop programming algorithms for automated specification of drive wing trajectories, as discussed below. Wing designs and trajectories for watercraft can be developed in an analogous way.

The wing-drive mechanism of the invention is characterized in that the drive wing can move simultaneously and independently in three rotational degrees of freedom relative to the fuselage, as described more fully hereinafter. For each drive wing, there are independent axis drive mechanisms for moving the drive wing about a flap axis and a yaw axis. There is another independent axis drive mechanism for changing the pitch of the drive wing. In this context, the axis drive mechanisms are said to operate "independently" if the motion imparted to the drive wing by each individual axis drive mechanism can be specified arbitrarily with respect to the motions imparted to the drive wing by the other axis drive mechanisms.

The flap and yaw axes are advantageously fixed with respect to the orientation of the fuselage. Provided that the yaw and flap axes are not coincident or parallel, they can have any relative orientation that allows for the drive wing to move up-and-down relative to an inertial frame of reference, backward-and-forward (or side-by-side) relative to the fuselage, and in any combination of up-and-down and backward-and-forward (or side to side). Note that the descriptors "flap" and "yaw" are arbitrary, as are the orientation of the "yaw" and "flap" axes relative to the fuselage. For design purposes, however, the "flap" axis is preferably substantially horizontal (for example +/- up to about 45° from horizontal) and the "yaw" axis is preferably substantially vertical (for example +/- up to about 45° from vertical) when the fuselage is in a nominally "ordinary" orientation during flight. It is not necessary that the flap and yaw axes be perpendicular to each other, although an angle of from about 45–90° is preferred, an angle of about 60–90° is more preferred and an angle of about 90° is most preferred. In the embodiment shown in FIG. 1, the flap axis is substantially horizontal and parallel with the nominal front-to-rear orientation of fuselage 100 (shown in outline), and the yaw axis is substantially vertical and perpendicular to the front-to-rear orientation of fuselage 100.

FIG. 1 illustrates an embodiment of a wing-drive mechanism according to the invention. Drive wing 101 is affixed to spar 102 that is connected to third axis drive mechanism 103 that includes joint 104 Third axis drive mechanism 103 is affixed, directly or indirectly, to fuselage 100 (shown in section, with the direction of its "front" being arbitrarily designated by arrow 150 and "up" relative to an inertial frame of reference being designated by arrow 151). Pitch axis 105 is fixed in space in relation to fuselage 100 by virtue of third axis drive mechanism 103 being affixed to fuselage 100. Third axis drive mechanism 103 affects rotation about pitch axis 105 in a direction of rotation indicated by the double-headed arrow a–a'. In FIG. 1, the direction of rotation about the pitch axis is arbitrarily designated as "positive" in the clockwise direction (facing outward along spar 102) and "negative" in the counterclockwise direction, but any suitable convention for expressing the rotation about the pitch axis may be used. Rotation about pitch axis 105 results in rotation of spar 102 and, correspondingly, a variation of the pitch of drive wing 101.

Joint 104 forms part of third axis drive mechanism 103 and is designed to transfer torque applied by third axis drive mechanism 103 about pitch axis 105 to spar 102 and thus affect changes of the pitch of drive wing 101 while simultaneously allowing drive wing 101 to move independently about yaw axis 123 and flap axis 113. A universal joint is suitable for this purpose. A coil spring can also be used to couple spar 102 to third axis drive mechanism 103, provided that the spring provides sufficient torsional strength (i.e. provides for efficient transfer of torque from third axis drive mechanism 103 to drive wing 101) but is flexible enough to permit spar 102 to be rotated about the yaw and flap axes. Similarly, a "concertina" type mechanism that is torsionally rigid but flexes freely about the yaw and flap axes over the desired range of motion is suitable.

A flap motion is imparted to drive wing 101 via first axis drive mechanism 111. First axis drive mechanism 111 provides torque to spar 102 about flap axis 113. In the embodiment shown, torque is transferred to spar 102 via guide rail 110, which forms part of first axis drive mechanism 111. As shown, guide rail 110 is in the form of a slotted arc, and spar 102 is inserted through slot 112 of guide rail 110. First axis drive mechanism is adapted to apply torque to guide rail 110, thereby rotating guide rail 110 and spar 102 about flap axis 113 to impart an oscillating flap motion to spar 102 and drive wing 101. The orientation of flap axis 113 is fixed in space with respect to fuselage 100 by virtue of first axis drive mechanism 111 being affixed directly or indirectly to fuselage 100. The direction of rotation imparted by first axis drive mechanism 111 to guide rail 110 is shown by double-headed arrow b–b'. A clockwise rotation (as seen facing the "rear" of the fuselage) is arbitrarily designated as "positive", and the opposite rotation is arbitrarily designated as "negative". The direction of flap motion imparted to drive wing 101 is shown by double-headed arrow B–B'.

A yaw motion is imparted to drive wing 101 via second axis drive mechanism 121. Second axis drive mechanism 121 provides torque to spar 102 about yaw axis 123. In the embodiment shown, torque is transferred to spar 102 via guide rail 120, which forms part of second axis drive mechanism 121. As shown, guide rail 120 is in the form of a slotted arc, and spar 102 is inserted through slot 122 of guide rail 120. In this embodiment the radius of curvature of guide rail 120 is larger than that of guide rail 110, so that the two guide rails can move freely and independently with respect to each other. The direction of rotation imparted by second axis drive mechanism 121 to guide rail 120 is shown by double-headed arrow c–c'. A clockwise rotation (as seen facing "upward" through the fuselage) is arbitrarily designated as "positive", and the opposite rotation is arbitrarily designated as "negative". The direction of yaw motion imparted to drive wing 101 is shown by double-headed arrow C–C'.

Axis drive mechanisms 103, 111 and 121 affect movement of drive wing 101 by providing torque to spar 102 about the pitch, flap and yaw axes. In response to a movement input signal, each of axis drive mechanisms 103, 111 and 121 (1) transfer torque to drive wing 101 (2) independently of the operation of the other axis drive mechanisms. As such, axis drive mechanisms 103, 111 and 121 each include means for receiving a movement input signal and applying torque in response thereto, as well as coupling apparatus for transferring the torque to spar 102. Axis drive mechanisms 103, 111 and 121 also include or are coupled to a source of mechanical power such as a motor. It will be readily appreciated that a great many variations in the designs and configurations of the axis drive mechanisms are possible.

Two simple but suitable variations of axis drive mechanisms are shown in FIG. 1. A first type is exemplified by third axis drive mechanism 103, which includes motor 161 that provides torque about shaft 160. Shaft 160 is aligned with pitch axis 105. Joint 104 is affixed to shaft 160 so that torque applied to shaft 160 is transferred directly to spar 102. Of course, gearing, clutches or the like can be interposed between shaft 160 and joint 104 if desired. A second variation of axis drive mechanism is exemplified by first and second axis drive mechanisms 111 and 121. Second axis drive mechanism 121 includes motor 181 that provides torque about shaft 180. Shaft 180 is aligned with yaw axis 123. Arced guide rail 120 is affixed to shaft 180 so that torque applied to shaft 180 is transferred to arced guide rail 120, thereby affecting movement of spar 102 in the direction indicated by double arrow C–C'. Similarly, first axis drive mechanism 111 includes motor 171 that provides torque about shaft 170 that is aligned with flap axis 113. The torque is applied to spar 102 by arced guide rail 110 that is affixed to shaft 170. Rotations of arced guide rail 110 affect movement of spar 102 in the direction indicated by the double arrow B–B'. As with third axis drive mechanism 103, many variations of this second variation of drive mechanism are possible, and apparatus such as clutches, gearing and the like may be added as appropriate.

In the embodiment shown in FIG. 1, mechanical power is supplied to axis drive mechanisms 103, 111 and 121 by motors 161, 171 and 181, respectively. Such motors can be of any type, including but not limited to internal combustion engines, pneumatic motors, steam engines, hydraulic motors, electrical motors and hybrid electrical motors. Electrical motors are preferred, as the use of an electrical motor for mechanical power greatly facilitates the creation of complex torque sequences over the course of a beat cycle. Electrical motors that operate bi-directionally are especially preferred as such motors tend to be light weight and offer the possibility of controlling the magnitude and direction of the applied torque through variations in the electrical power supply to the motor.

Piezoelectric actuators can be used to supplement or replace the aforementioned motors. These actuators include a material, commonly a ceramic material such as lead titanate, lead zirconate titanate, lead magnesium niobate, lead metaniobate, lead zirconate and the like that become reversibly distorted in a predetermined direction when an electric current is applied. Piezoelectric actuators are well known and commercially available. Actuators such as BM1110-400, BM1110-532, BM1120-400, BM1120-532, BM1125-400 and BM1125-532, all sold by Sensor Technology, Ltd., Ontario Canada, are suitable.

Although each axis drive mechanism shown in FIG. 1 has its own source of mechanical power, it is possible through appropriate linkages for two or more axis drive mechanisms to share a single mechanical power source.

Axis drive mechanisms 103, 111 and 121 also contain connections to fuel or power supplies. If an axis drive mechanism does not contain a dedicated source of mechanical power, it is coupled to one. Suitable power supplies include fossil fuels, compressed gasses, steam, batteries, hydrogen fuel cells, solar panels, generators or combinations of these.

The combined operations of axis drive mechanisms 103, 111 and 121 move drive wing 101 through its trajectory. The trajectory produced through the combined operations of axis drive mechanisms 103, 111 and 121 can be altered through changes in the frequency, sequencing, phasing and magnitude of the flap, yaw and pitch motions, or through combinations of such changes. The ability of the wing-drive mechanism to affect multiple trajectories is an important advantage of this invention, and is a result of employing a wing-drive mechanism that permits the drive wing to move over three independent rotational degrees of freedom. By changing the drive wing trajectory, both the magnitude and the direction of the net force (relative to the fuselage or an inertial frame of reference, or both) created by the drive wing over the course of a beat cycle or series of beat cycles can be varied in a predetermined way.

Flap, yaw and pitch motions are affected by the application of torque to drive wing 101 by each of axis drive mechanisms 103, 111 and 121. To affect a specific drive wing trajectory, each of axis drive mechanisms 103, 111 and 121 apply torque, over the course of a beat cycle, in a predetermined pattern. Generally, the torque applied by each of axis drive mechanisms 103, 111 and 121 changes in a continuous or piecewise continuous manner over the course of beat cycle. To maintain a specific drive wing trajectory, those torque patterns are simply repeated over multiple beat cycles. Changes in drive wing trajectory are affected by altering the pattern of torque that is applied by at least one and possibly two or three of the axis drive mechanisms 103, 111 or 121.

In the embodiment shown in FIG. 1, optional mass balances 130 and 130a are affixed to slotted arc 110 and mass balances 140 and 140a are affixed to slotted arc 120. These provide counterweights to spar 102 and wing 101, and thus allow axis drive mechanisms 111 and 121 to work against reduced mass inertial forces as they move wing 101. The mass balances can be of any suitable shape, form and material of construction.

Figure 12:
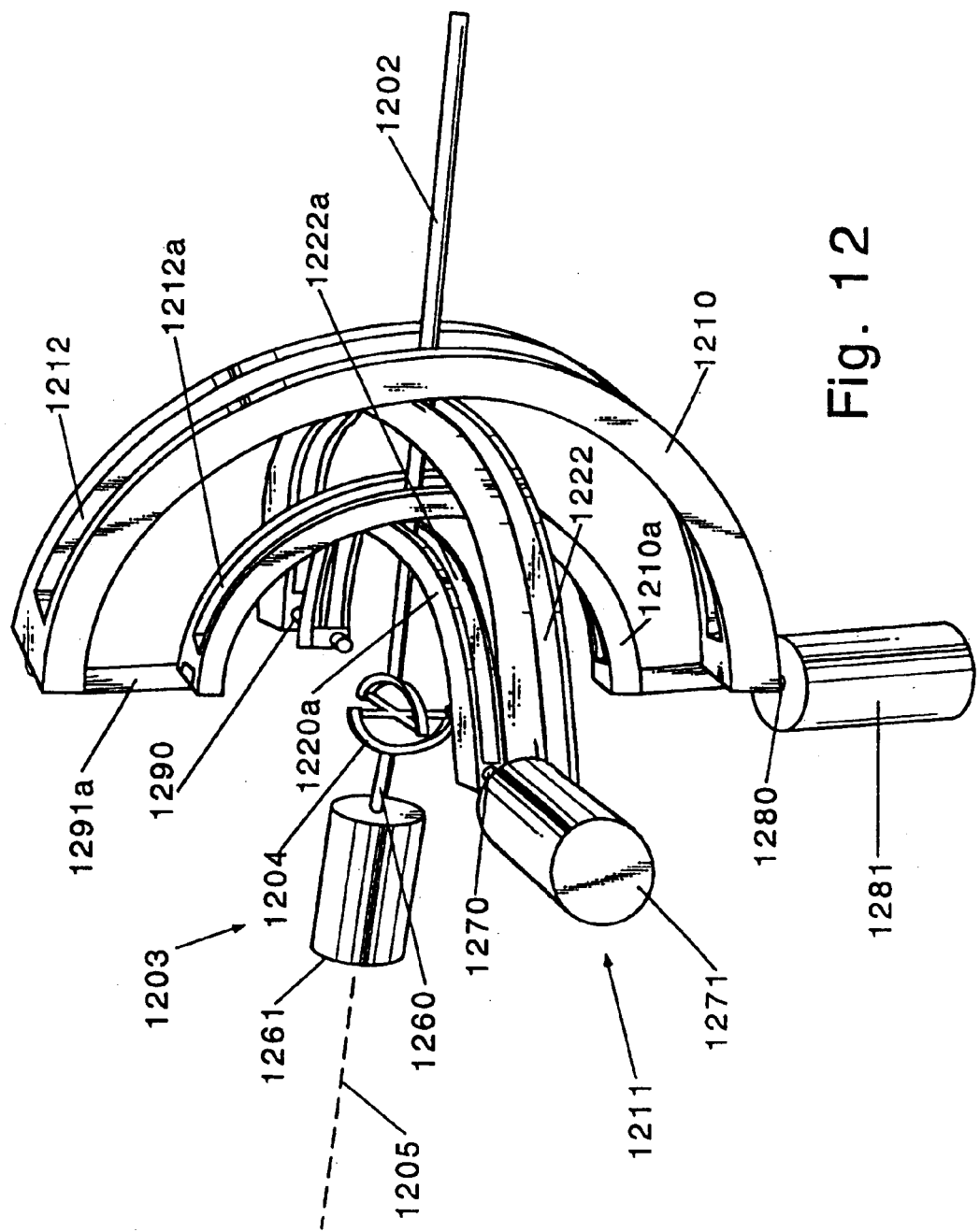
FIG. 12 illustrates a sixth embodiment of the wing-drive mechanism of this invention.

Suitable springs may also be inserted between the drive-axis shafts and the drive-motor fuselage bases to act as inertial energy storage devices and to supplement the mass balance weights. Also, the drive motors may be doubled up by placing motors on either side of the slotted-arc rails. Another pitch control motor may be placed in parallel or in series with the existing pitch control motor. Another embodiment, in which the slotted arc are doubled up as a fail-safe measure, is shown in FIG. 12. In FIG. 12 spar 1202 is connected to joint 1204, which is connected to shaft 1260, which is in turn connected to motor 1261. Motor 1261, shaft 1260 and joint 1204 together form third axis drive mechanism 1203, which operates in the same manner as third axis drive mechanism 103 in FIG. 1. A second axis drive mechanism includes motor 1281, shaft 1280, slotted arcs 1210 and 1210a, which have slots 1212 and 1212a, respectively. Slotted arcs 1210 and 1210a are connected together via connectors 1291 and 1291a, so that they rotate together as motor 1281 operates. A first axis drive mechanism includes motor 1271, shaft 1270, slotted arcs 1220 and 1220a, which have slots 1222 and 1222a, respectively. Slotted arcs 1210 and 1210a are connected together on one end by shaft 1270 and at the other via rod 1290, so that they rotate together as motor 1271 operates. As before spar 1202 runs through slots 1220, 1220a, 1210 and 1210, and so is moved when motor 1270 and/or 1271 is actuated. Note that counterweights as shown in FIG. 1 may be and preferably are used in conjunction with this embodiment. Also, suitable springs may be inserted between the drive-axis shafts and the drive-motor fuselage bases to act as inertial energy storage devices and to supplement the mass balance weights. Also, the drive motors may be doubled up by placing motors on either side of the slotted-arc rails. Another pitch control motor may be placed in parallel or in series with the existing pitch control motor.

Figure 2:
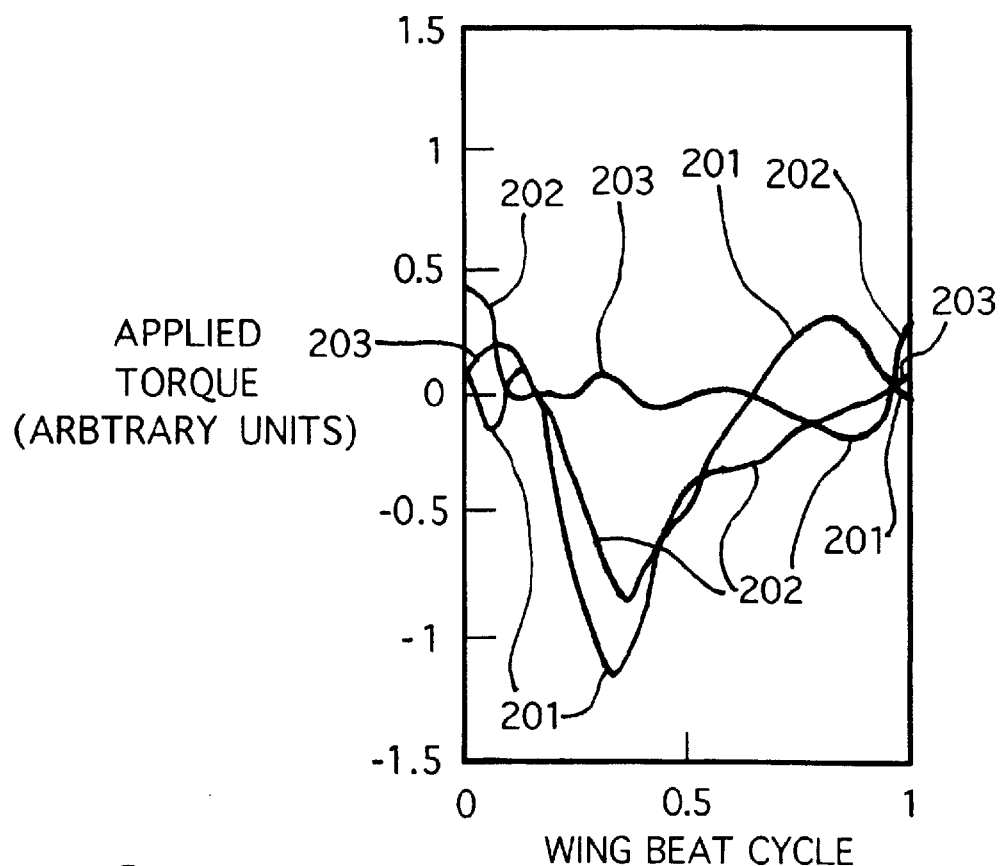
FIG. 2 is a graphical representation of an example of how torques can be applied by the first, second and third axis drive mechanisms of the wing-drive mechanism of the invention over the course of a beat cycle.

FIG. 2 provides a graphical illustration of how torques might be applied over a beat cycles by each of the first, second and third axis drive mechanisms to affect an arbitrary drive wing trajectory. In FIG. 2, the applied torque (in arbitrary units) is plotted against time over one beat cycle. Curves 201, 202 and 203 correspond to the torque applied by the first, second and third axis drive mechanisms, respectively. Positive and negative torque values indicate arbitrarily designated directions of rotation about the flap, yaw and pitch axes for curves 201, 202 and 203, respectively. As shown, the patterns of applied torque can be graphically illustrated as a continuous or piecewise continuous function.

Thus, in order to affect a given drive wing trajectory, it is necessary to create a set of coordinated torque patterns that are to be applied by each of the axis drive mechanisms over a course of a beat cycle. Control over the wing-drive mechanism of this invention is exercised by (1) identifying a desired drive wing trajectory and (2) generating and transmitting movement input signals which actuate the respective axis drive mechanisms to supply the appropriate torque sequences to affect the desired drive wing trajectory.

Figure 5:
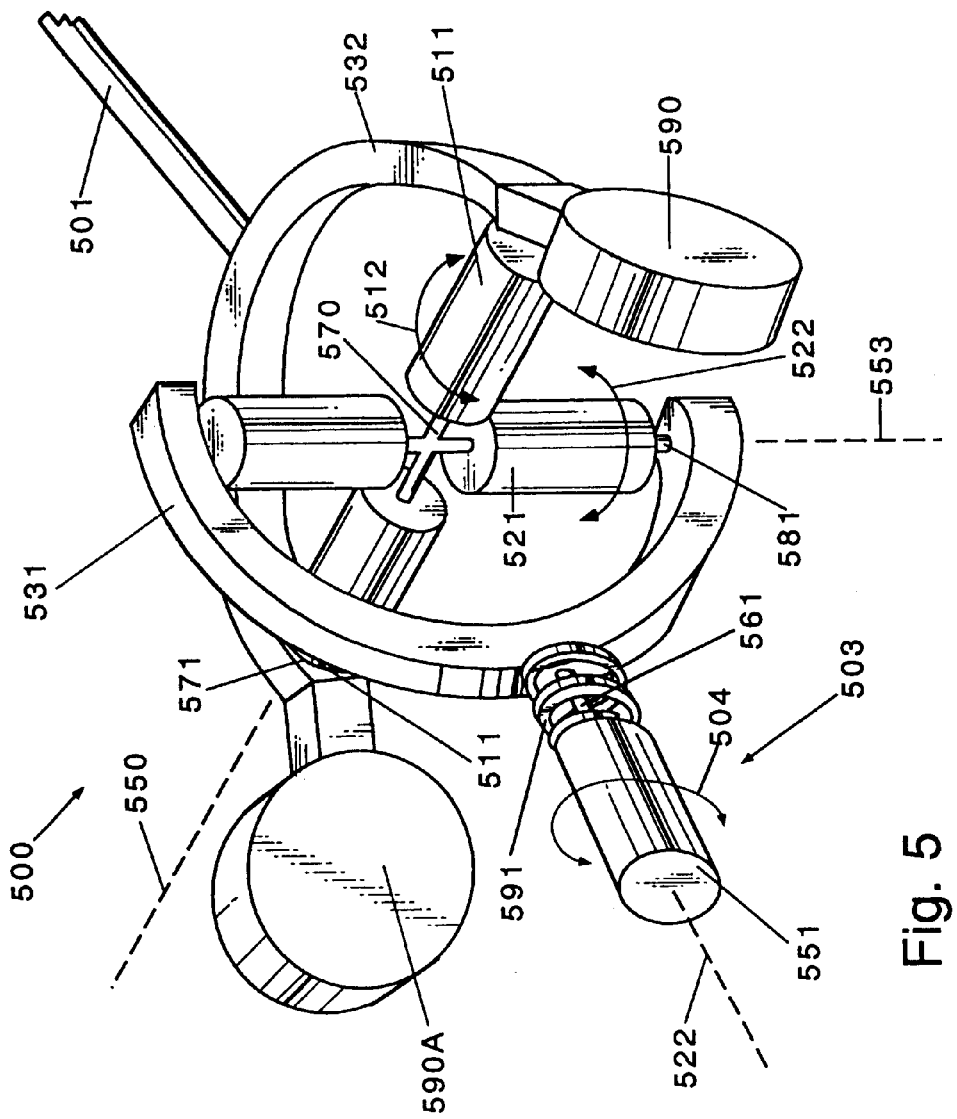
FIG. 5 is an overhead view of a second embodiment of the wing-drive mechanism of this invention.

An alternative design for the wing-drive mechanism of this invention is illustrated in FIG. 5. In FIG. 5, joint 500 connects third axis drive mechanism 503 with spar 501. Spar 501 is affixed to the drive wing (not shown). Third axis drive mechanism 503 is affixed to arced joint member 531 and directly or indirectly to the fuselage. It includes motor 551, spring 591 and shaft 561. Third axis drive mechanism 503 operates in response to a third movement input signal to rotate shaft 561 about pitch axis 552 in a direction indicated by double headed arrow 504, thereby affecting a like rotation of arced joint member 531 and spar 501. Arced joint member 531 is rotatably affixed to shafts 581. Second axis drive mechanisms 521 are mounted on central cross-member 570, and in response to a second movement input signal affect rotation of cross-member 570 about shafts 581 (and yaw axis 553) in a direction indicated by double-headed arrow 522. This imparts a yaw motion to spar 501. First axis drive mechanisms 511 are mounted on central cross member 570, and in response to a first movement input signal rotate shafts 571 about flap axis 550. Shafts 571 are affixed to arced joint member 532 so that arced joint member 532 moves in a flap direction as shafts 571 rotate. Spar 501 is affixed to arced joint member 532. Counterweights 590 and 590A are affixed to arced joint member 532 and balance the mass of the wing (not shown).

FIG. 7 illustrates yet another design variation for a wing-drive mechanism. Third axis drive mechanism 703 includes motor 761 which rotates shaft 760 about pitch axis 705 in the direction indicated by double arrow g–g'. Shaft 760 is affixed to joint 704, and joint 704 transfers torque to spar 702. A drive wing (not shown) is affixed to spar 702. First axis drive mechanism 711 includes motor 771, which rotates shaft 770 about axis 713. Shaft 770 is threaded, and sleeve 775 is rotatably mounted on a worm gear that is, in turn, mounted on the threads of shaft 770. As shaft 770 is rotated, sleeve 775 and the underlying worm gear travel back and forth along shaft 770 in the direction indicated by double-headed arrow e–e'. Connector 772 is hingedly mounted to sleeve 775 through ball joint 773 and to connector 791 through ball joint 774. Connector 791 is mounted onto spar 702 in such a way that spar 702 can rotate freely beneath connector 791. As sleeve 775 moves up and down shaft 770, it pulls connector 772 and connector 791 upwardly and downwardly, imparting a flap motion to spar 702 in the direction indicated by double-headed arrow E–E'. Second axis drive mechanism 721 includes motor 781, which rotates shaft 780 about axis 723. Shaft 780 is threaded, and sleeve 785 is rotatably mounted on a worm gear that is, in turn, mounted on the threads of shaft 780. As shaft 780 is rotated, sleeve 785 travels back and forth along shaft 780 in the direction indicated by double-headed arrow f–f'. Connector 782 is hingedly mounted to sleeve 785 through ball joint 783 and to connector 791 through ball joint 784. As sleeve 785 moves back and forth along shaft 780, it pulls connector 782 and connector 791 back and forth, imparting a flap motion to spar 702 in the direction indicated by double-headed arrow F–F'.

FIG. 8 illustrates a wing-drive mechanism suitable for use with a source of mechanical power that operates in only one direction. Spar 802 connects a drive wing (not shown) with joint 804. Joint 804 is suitably a universal joint or other connection that transfers rotational movement from third axis drive mechanism 803 to spar 802 while permitting independent motion to be imparted by first axis drive mechanism 811 and second axis drive mechanism 821. Joint 804 is fixed in space in relation to the fuselage (not shown) through connections that are also not shown. Third axis drive mechanism 803 includes wheel 805, which has radial slot 806. Peg 807 extends from member 808 and into slot 806. Wheel 805 is coupled to a source of mechanical power (not shown) which, during operation, causes wheel 805 to rotate in the direction indicated by arrow j–j'. The rotation of wheel 806 causes member 808 to move in a up-and-down motion. Member 808 is toothed where it contacts worm gear leg 884, which is affixed to joint 804, in such a way that as member 808 moves up-and-down, it rotates worm gear leg 884. This rotation of worm gear leg 884 rotates joint 804 and causes spar 802 to rotate, thereby effecting changes in the pitch of the drive wing.

First axis drive mechanism 811 includes wheel 812. Wheel 812 includes radial slot 813. Frame 815 includes wheel peg slot 816. Wheel peg 814 is inserted into or through wheel peg slot 816 and radial slot 813. Frame 815 also includes spar slot 817, through which spar 802 is inserted. Wheel 812 is coupled to a source of mechanical power (not shown) which rotates wheel 812 in the direction indicated by arrow h–h'. The rotation of wheel 812 causes frame 815 to move up-and-down. This movement of frame 815 causes spar slot 817 to move up-and-down, and in turn causes spar 802 to rotate up-and-down about joint 804, as shown by double-headed arrow H–H'.

Second axis drive mechanism 821 includes wheel 822. Wheel 822 includes radial slot 823. Frame 825 includes wheel peg slot 826. Wheel peg 824 is inserted into or through wheel peg slot 826 and radial slot 823. Frame 825 also includes spar slot 827, through which spar 802 is inserted. Wheel 822 is coupled to a source of mechanical power (not shown) which rotates wheel 822 in the direction indicated by arrow i–i'. The rotation of wheel 822 causes frame 825 to move left-to-right. This movement of frame 825 causes spar slot 827 to move left-to-right, and in turn causes spar 802 to rotate left-and-right about joint 804, as shown by double-headed arrow I–I'.

The position of pegs 807, 814 and 824 may be varied along the respective lengths of slots 806, 813 and 826 to vary the amplitude of the motion applied to spar 802.

In the embodiment shown in FIG. 8, each axis drive mechanism may include or be coupled to its own source of mechanical power. Alternatively, a single power source of mechanical power, such as an internal combustion engine, may be used to power two or even three of the axis drive mechanisms. Movement input signals are delivered to the motors directly, or to intermediate clutch and/or gear systems (also not shown) in order to affect the desired movement of each axis drive mechanism.

Figure 9:
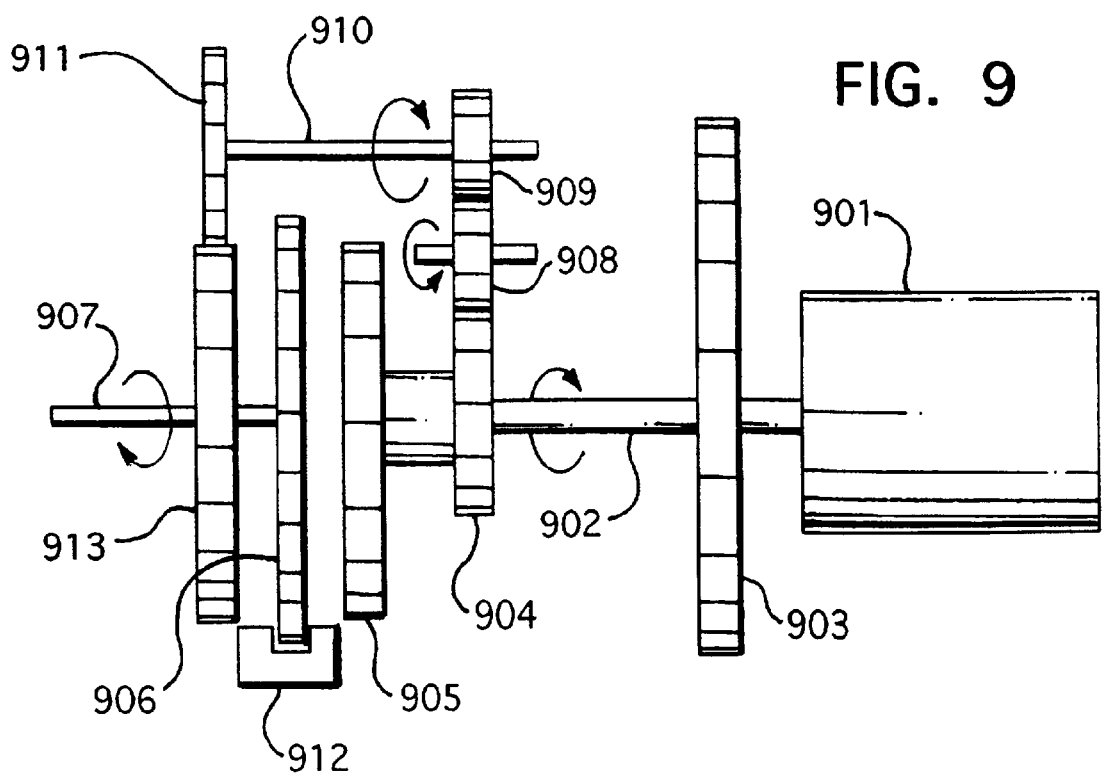
FIG. 9 illustrates a fifth embodiment of the wing-drive mechanism of the invention.

FIG. 9 illustrates an axis drive mechanism that uses a unidirectional motor. Motor 901 operates to rotate shaft 902 in direction shown. Optional flywheel 903 is also mounted on shaft 902, as are gears 904 and first plate 905. First plate 905 rotates in the same direction as gear 904 and shaft 902 when motor 901 is operated. Through a series of gears 908, 909 and 911, motor 901 rotates second plate 913 in the opposite direction than plate 904. Second plate 913 has a central hole (not shown) that is axially aligned with shaft 902. Spar 907 is slidably mounted through the hole in second plate 913 and is affixed to clutch plate 906, so that spar 907 rotates when clutch plate 906 is rotated and spar 907 moves back and forth within the hole in second plate 913 as clutch plate 906 is moved. Actuator 912 is in communication with clutch plate 906, and serves to move clutch plate 906 into contact with either first plate 905 or second plate 913. Frictional forces cause clutch plate 906 to rotate in the same direction as the contacting plates 905 or 913.

A preferred means of controlling the wing-drive mechanism of this invention is through the automated specification of drive wing trajectories and resultant automated generation of the movement input signals. An automated trajectory specification system (ATSS) can be used to specify the drive wing trajectory. The ATSS preferably includes a fuzzy logic processor or neural network, and generation of movement input signals is preferably accomplished through automated application of a non-linear controlling function.

Figure 4:
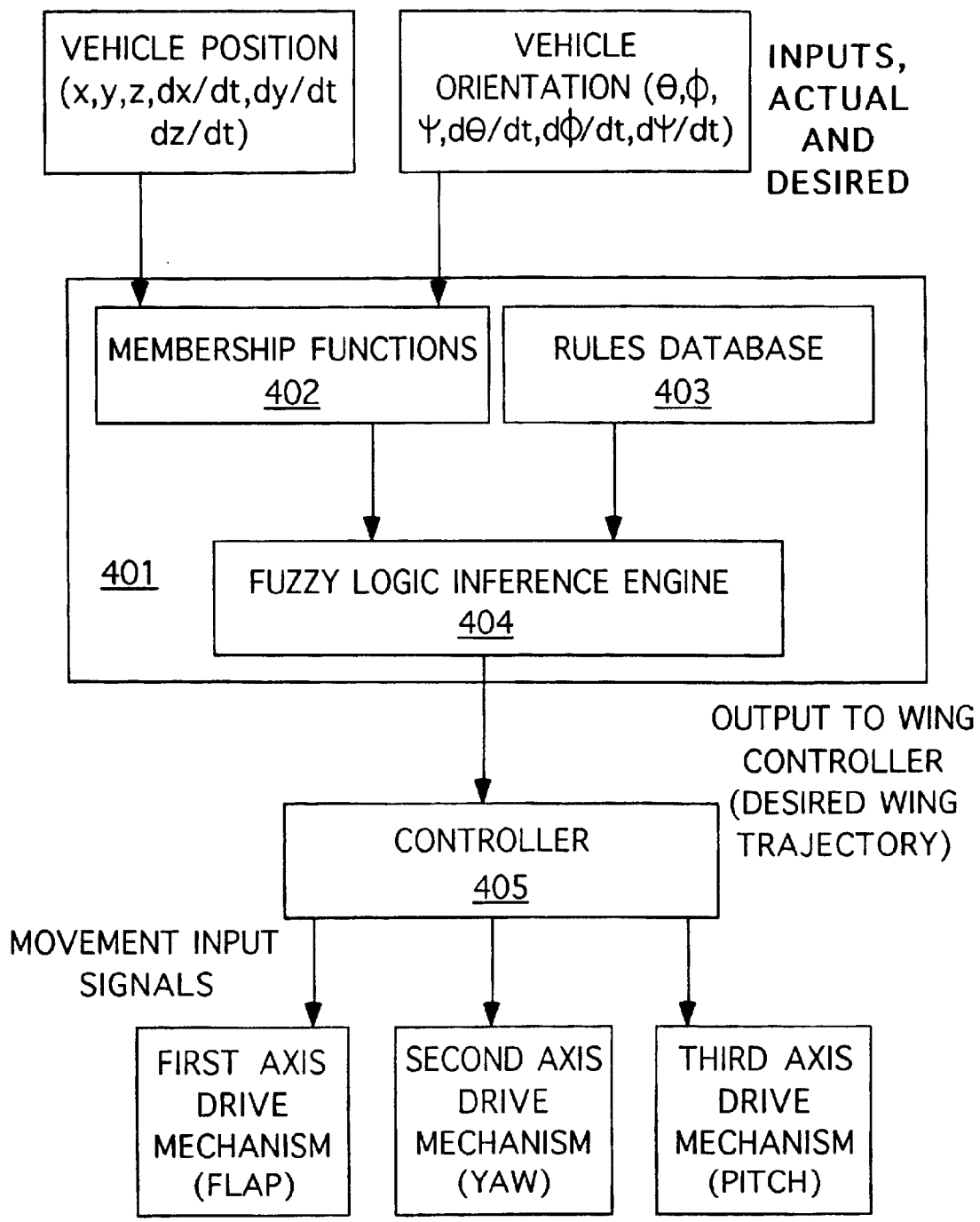
FIG. 4 is a schematic diagram of an automated control system for the wing-drive mechanism of this invention.

A schematic diagram of an exemplary fuzzy logic ATSS is shown in FIG. 4. In FIG. 4, a fuzzy logic ATSS 401 contains a fuzzy logic inference engine 404, a set of membership functions 402 coupled to the fuzzy logic inference engine 404, and a rules database 403 that is also coupled to fuzzy logic inference engine 404. As shown, inputs to the fuzzy logic ATSS include current data specifying the position of the vehicle in space and the rate of motion of the vehicle. This data is provided, in this embodiment, in the form of three inertial position vectors x, y and z, which identify the position of the vehicle relating to an external, inertial frame of reference, and three corresponding inertial velocity vectors dx/dt, dy/dt and dz/dt. Inputs specifying the orientation of the vehicle in space ($\Theta$, $\Phi$, $\Psi$) and the rate of change of the vehicle's orientation ($\Theta$/dt, d$\Phi$/dt, d$\Psi$/dt) are also provided to the fuzzy logic ATSS in the preferred embodiment illustrated. Acceleration data (i.e. $d^2x/dt^2$, $d^2y/dt^2$, $d^2x/dt^2$, $d^2\Theta/dt^2$ $d^2\Phi/dt^2$ and/or $d^2d^2\Psi/dt^2$) can also be inputted. When drive wing trajectories are specified by taking vehicle orientation into account, the further advantage of affecting a drive wing trajectory independent of the vehicle orientation can be achieved.

The actual positional, orientation, velocity and acceleration inputs are preferably sampled over an appropriately short time period by an appropriate sensing device, smoothed if necessary, and provided to the fuzzy logic ATSS in real time.

Fuzzy logic engine 404 "fuzzifies" the input values using membership functions 402 to create fuzzy inputs that relate actual position, velocity and/or acceleration and, optionally but preferably, orientation, rate of change in orientation and/or rate of change of rate of change in orientation with the corresponding desired values. Fuzzy logic engine 404 then applies rules database 403 through application of "if-then" rules to generate a fuzzy output that relates the desired vehicle movement to a desired drive wing trajectory, preferably a desired drive wing trajectory for each wing-drive mechanism on the vehicle. The fuzzy output is defuzzified to produce "sharp" outputs, i.e. a specific desired drive wing trajectory for each wing-drive mechanism. The sharp outputs can take any convenient form, but are most preferably a continuous signal or signals to controller 405 that, at any specific point in time, specifies a desired angular position, velocity and/or acceleration of the drive wing. The sharp outputs are delivered to controller 405, which in turn provides movement input signals to each of the three axis drive mechanisms for each drive wing. If there are more than one wing-drive mechanisms, controllers for the additional wing-drive mechanisms are also in communication with fuzzy logic ATSS 401 and receive a corresponding desired trajectory for that drive wing. It is preferred that the fuzzy logic ATSS generates desired drive wing trajectories in real time.

Accordingly, a suitable output from a fuzzy logic ATSS to the controller is a signal that at any time $t_s$ provides values corresponding to or convertible into a desired flap, pitch and yaw angle, angular velocity about the flap, yaw and pitch axes, and/or angular accelerations about each of those axes. These signals can be in analog or digital form. Referring to the specific drive wing trajectory illustrated in FIG. 3, a suitable output from a fuzzy logic ATSS at time $t_s$ is a signal or signals corresponding to points 305, 306 and 307 and the values of the first and preferably also the second derivatives of curves 301, 302 and 303 at that time. These signals together designate, for any time $t_s$ the desired drive wing angular position, velocity and preferably acceleration. As shown in FIG. 3, these values are conveniently expressed in terms of Euler angles, but they can be easily converted to rotational angles about flap, yaw and pitch axes and transmitted to the controller in such form.

The development of membership functions 402 and the if-then rules database is conveniently based on empirically or modeled relationships between drive wing trajectories and vehicle motion that result from the aerodynamic and inertial forces created as a result of affecting each of such drive-wing trajectories. In this way, an if-then rules database is developed which correlates a desired change in vehicle position and/or motion to a drive wing trajectory and frequency (or in the case where there is more than one wing-drive mechanism, a set of drive wing trajectories and frequencies).

For purposes of developing automated control of the wing-drive mechanism of this invention, it is noted that in most if not all cases, drive wing trajectories such as represented in FIG. 3 can be approximated by a mathematical function. For example, each of curves 301, 302 and 303 in FIG. 3 can be approximated as periodic trigonometric function, i.e., as the sum of a series of sine and cosine functions. Such a periodic trigonometric function has the form $$f(t) = \frac{a_{of}}{2} + \sum_{n=1}^{N} \{a_{nf}\cos(\eta\omega_f t) + b_{nf}\sin(\eta\omega_f t)\} \quad (1)$$

for a suitable number of terms N. Generally, a better match of the function to an actual curve increases with increasing N. In the foregoing function f(t), the values of $a_{of}$, $a_{nf}$ and $b_{nf}$ and the frequency $\omega_f$ determine the graphical shape of the resulting function f(t), and f(t) itself represents $\phi(t)$ $\theta(t)$, and/or $\psi(t)$ (to use the angular designations shown in FIG. 3). Accordingly, the specification and designation of a particular drive wing trajectory can be achieved by generating values for $a_{of}$, $a_{nf}$, $b_{nf}$ and $\omega f$ for each f(t) (i.e., $\phi(t)$, $\theta(t)$, and $\psi(t)$) for each wing drive mechanism. Thus, a suitable way of developing membership functions and an if-then rule database is by relating desired vehicle movements (i.e., one or more of x, y, z, dx/dt, dy/dt, dz/dt, $d^2x/dt^2$, $d^2y/dt^2$, $d^2z/dt^2$, $\Phi$, $\Theta$, $\Psi$, $d\Phi/dy$, $d\Theta/dy$, $d\Psi/dt$, $d^2\Phi/dt^2$, $d^2\Theta/dt^2$ and $d^2\Psi/dt^2$) to specific drive wing trajectories by associating such movements with a set of values for $a_{of}$, $a_{nf}$, $b_{nf}$ and $\omega_f$. Once values for $a_{of}$, $a_{nf}$, $b_{nf}$ and $\omega f$ are specified for each axis drive mechanism of each wing drive mechanism, the ATSS calculates the values of desired drive wing positions $\psi$, $\theta$, $\phi$ (expressed, for example, as Euler angles), desired drive wing angular velocities $\psi'$, $\theta'$ and $\phi'$ and optionally desired drive wing angular accelerations $\psi''$, $\theta''$, and $\phi''$ for each wing drive mechanism. At any time $t_s$, the ATSS generates signals that correspond to those values and transmits those signals to the controller. Those signals designate desired drive wing angular position, velocity and acceleration at any time $t_s$.

Beside Fourier methods, other mathematical methods of generating the wave functions, such as Wavelet, Bessel and/or Taylor series methods, can alternatively be used. Note further that if the ATSS employs a neural network or other type of programming to specify desired wing trajectories, those programs may use inputs as discussed above with respect to the fuzzy logic processor, and may generate the same types of outputs.

In this preferred embodiment, the controller compares this desired drive wing position, velocity and optionally acceleration with actual drive wing position, velocity and optionally acceleration, calculates the torque needed to be applied by each of the first, second and third axis drive mechanisms, and delivers the appropriate movement input signals to each of the axis drive mechanisms. If the desired drive wing position, velocity and/or acceleration are specified in terms of Euler angles, conversion to rotation about each of the flap, yaw and pitch axes can be done by the fuzzy logic ATSS (or neural network or other ATSS) or the controller using pre-established relationships.

Thus, in the preferred embodiment, controller 405 receives signals from fuzzy logic ATSS 401 that specify desired drive wing angular position, velocity and/or acceleration as well as inputs that specify actual drive angular wing position, velocity and/or acceleration. (Note that in any instance where desired and actual inputs for a variable are provided to the controller or ATSS, these can be supplied in the form of the differences in these values.) Controller 405 then develops movement input signals for the first, second and third axis drive mechanisms in real time by applying a controlling function that calculates needed applied torques for all three axis drive mechanisms by comparing the actual and desired drive wing angular position, velocity and/or acceleration inputs (or the value of the difference between them). Most preferably, the movement input signals are generated continuously. At any point in time $t_s$, the movement input signals specify the torques to be applied at time $t_s$ by each of the axis drive mechanisms. An example of a non-linear, Lyapunov-based controlling function for calculating a needed applied torque to affect a desired wing trajectory within prescribed error limits by comparing actual with desired angular velocities and accelerations as applied to moth wings is described by Smith and Zenieh, "Trajectory Control of Flapping Wings: Towards The Development of Flapping-Wing Technology", 6th AIAA/NASA/USAF Multidisciplinary Analysis and Optimization Symposium (1996).

Singular perturbation and/or $H_\infty$ and/or Kalman Filter methods of control can also be used to generate a controlling function for creating movement input signals in real time.

In the preferred method, movement input signals are generated by a controlling function that receives sampled actual orientations, angular velocities and/or angular accelerations of the drive wing about each of the flap and yaw axes, and the actual pitch, rate of change of pitch and/or acceleration of the pitch, and compares those variables to corresponding desired values. For each wing-drive mechanism, the preferred controller then applies a controlling function to the actual and desired drive wing angular position, velocity and/or acceleration data to calculate the torques that are to be applied. The controller generates corresponding first, second and third movement input signals and transmits them to the first, second and third axis drive mechanisms. Preferably, the controller receives drive wing angular position, velocity and/or acceleration inputs continuously (or over very short time intervals) and generates the movement input signals continuously (or over very short time intervals). Most preferably, the preferred controller calculates the needed torques using a Lyapunov-based controlling function. Suitable controlling functions for a particular drive wing design can be developed using methods similar to those described in Smith and Zenieh, cited above.

A preferred controller that develops the movement input signals therefore includes means for receiving sampled drive wing angular position, velocity and/or acceleration data, a means for calculating the torques to be applied to the drive wing by each of the first, second and third axis drive mechanisms to affect a desired drive wing trajectory, and means for generating and transmitting corresponding movement input signals for each of the axis drive mechanisms. In addition, a preferred controller includes or receives desired drive wing trajectory inputs, advantageously in the form of desired drive wing angular position, velocity and/or acceleration.

Drive wing angular position, velocity and acceleration data are advantageously obtained using a sensing device that directly monitors the drive wing itself (for example, an optical, laser, ultrasonic or similar system), or preferably by using one or more sensing devices that directly detect rotational movements of each of the axis drive mechanisms about their respective axes of rotation. Optical, laser or mechanical encoders, especially optical or laser shaft encoders, are preferred sensing devices. Referring to FIG. 1, optical and/or laser shaft encoders can be mounted on each of shafts 160 and 180 (as well as the corresponding shaft of axis drive mechanism 111) to monitor the angular rotation, angular velocity and/or angular acceleration of each shaft. The encoder then generates a corresponding signal and communicates the signal to the controller. The sensing device preferably provides drive wing angular position, velocity and/or acceleration data to the controller over a suitably short sampling period, and may smooth the data before providing it to the controller. The wing movement input signals to the controller can be of any suitable form, but are preferably electrical, electromagnetic or ultrasonic signals, most preferably an electrical signal. The signal may be in analog or digital form. Suitable apparatus for transmitting the signals to the controller include physical connections from the sensing device to the controller, such as wiring or fiber optic connections, or transmission apparatus such as wire, light, laser, radio or ultrasonic transmitters, and the like. The controller includes a corresponding means for receiving the signal, such as a suitable receiver for wire, light, laser, radio or ultrasonic signals.

The preferred controller also contains a computer that calculates needed applied torques for each axis drive mechanism and generates corresponding movement input signals. The computer can be of any type that can perform the needed calculations quickly enough to affect the desired drive wing trajectory and frequency. One or more microprocessors having a topologically embedded program for receiving drive wing motion input signals and calculating the required torque for each axis drive mechanism using the aforementioned controlling functions is suitable. Alternatively, a general-purpose computer programmed in a similar way, or a programmable microprocessor, again similarly programmed, is suitable.

It is noted that although the ATSS and the controller have been discussed above as separate devices, it is possible and even desirable that both functions be integrated into a single device. For example, a fuzzy logic or neural network processor is suitably programmed onto a general-purpose computer, a programmable microprocessor or topologically embedded on a microprocessor. The controller can be programmed into or embedded on the same processor or computer if desired. However, the functions can reside on separate computers.

The preferred controller just described creates signals corresponding to the necessary torque sequences for each axis drive mechanism. These signals are transmitted to the first, second and third axis drive mechanisms, respectively, in any convenient form. The signals can be in digital or analog form. However, a preferred signal form is an analog of the desired torque pattern, preferably an analog electrical signal or an analog electromagnetic signal such as a wire, light, laser, sonic or radio signal. The controller and the axis drive mechanisms include communication means adapted to the form of the signal. Such means include electrical wiring, fiber optic connections, and/or appropriate light, laser, sonic or radio transmitters and receivers.

More preferably, the controller is in electrical communication with each drive mechanism, and the movement input signals are or are convertible to analog electrical signals. Most preferably, these analog electrical signals are amplified if necessary and used as the electrical power supply for electric or hybrid motors that supply mechanical power to the axis drive mechanisms, with the pattern of the amplified signal corresponding to the desired pattern of torque to be applied by the corresponding axis drive mechanism over the course of a beat cycle. In this most preferred embodiment, the first, second and third movement input signals double as or are amplified to form the power supplies for the respective axis drive mechanisms.

Alternatively, the movement input signal can be amplified if necessary and used to affect the operation of gears, clutches, springs and/or other devices that couple the source of mechanical power to the drive wing to control the applied torque in a corresponding manner. In all cases, the movement input signals can be repeated as often as desired to create continuous beating over a predetermined drive wing trajectory.

To develop a simplified controller, sets of coordinated movement input signals for each of the first, second and third axis drive mechanisms are developed for a number of specific wing trajectories. The signals are then recorded onto a suitable recording medium or stored in an electronic database. Alternatively, the signals can be expressed as mathematical functions, and the mathematical functions programmed into a computer or programmable processor or topologically embedded onto a microprocessor. To affect drive wing movement in a desired trajectory, the controller is instructed to select a specific set of movement input signals or functions, generate a corresponding set of movement input signals, and transmit the signals to the axis drive mechanisms.

Thus, in one aspect, the wing-drive mechanism of this invention receives movement input signals from a controller that can generate two or more preselected sets of coordinated movement input signals that each include a first, second and third movement input signal for the first, second and third axis drive mechanisms, respectively. The preselected sets of coordinated movement input signals, or corresponding mathematical functions, can be recorded in any suitable form. For example, they can be recorded in a portable medium such as magnetic recording tape or a compact disk, digitally stored in an electronic memory means or be embedded in a program residing in a memory device or topologically embedded on a microprocessor. The controller therefore advantageously accesses said sets of movement input signals or corresponding mathematical functions, selects among such recorded movement input signals in response to a command, and generates and transmits said movement input signals to the corresponding drive mechanisms. Depending on the form in which the sets of movement input signals are recorded, suitable controllers include, for example, simple apparatus such as an ordinary tape player, an ordinary compact disk player, or a computer (programmed general purpose computer, programmed programmable microprocessor or microprocessor) that is programmed to select among pre-programmed or pre-recorded sets of movement input signals or corresponding mathematical functions when instructed and transmit the corresponding movement input signals to the first, second and third axis drive mechanisms.

To use a simplified controller as just described, a desired drive wing trajectory is selected, appropriate instruction is provided to the controller, and in response the controller generates a set of first, second and third movement input signals for the corresponding axis drive mechanisms to affect that drive wing trajectory. It is noted that a simplified controller of this type can be used in conjunction with a variety of means for specifying drive wing trajectories. Because the movement input signals are developed beforehand, all that is necessary to specify a particular drive wing trajectory is to provide a signal to the controller instructing it to generate one particular set of movement input signals or another. Thus, the simplified controller of this type is easily adapted to manual control through common devices such as a simple joystick, computer keyboard, radio controller, or the like, which can be configured to send two or more distinct signals to the controller, each of which constitutes an instruction to the controller to create a specific set of movement input signals. The simplified controller can also be used with an ATSS. Such preferred ATSS include a fuzzy logic or neural network ATSS as described above with the difference that the signal generated by the fuzzy logic or neural network ATSS is a simple instruction to generate a specific set of pre-developed movement input signals.

The controller and ATSS can be situated on the vehicle or be remotely located. Both the controller and ATSS can be remote systems, in which case the movement input signals for each drive mechanism are transmitted to the individual axis drive mechanisms on the vehicle. However, it is preferred that at least the controller be located on the vehicle, in order to simplify the signals that must be transmitted to the vehicle from a remote location.

Actual vehicle position, velocity, acceleration, orientation, rate of change of orientation and rate of change of rate of change of orientation data can be supplied to an ATSS in several ways. Systems for sampling and supplying this data may be located on the vehicle or remotely. A suitable system for developing orientational inputs (orientation, rate of change in orientation and/or rate of change of rate of change of orientation) is an on-board gravitational stabilization/inertial sensor. Such sensors are commercially available, and can also be used to develop inputs relating to the vehicle position, velocity and/or acceleration. Alternatively, one or more gyroscopes can be used to develop orientational and/or vehicle position, velocity and acceleration inputs, and on-board inertial navigation systems can provide inputs as to vehicle position, velocity and acceleration. Position, velocity and acceleration inputs can also be developed by suitable means for accessing the Global Positioning System or other external positioning system. On-board radar, sonar, visual or other systems can also be used to develop positional and or orientational inputs. Of course, any of these methods for developing the inputs can be external to the vehicle.

Similarly, desired vehicle position, velocity, acceleration, orientation, rate of change of orientation and rate of change of rate of change of orientation data can be supplied to the ATSS in many ways. These include, for example, radio controllers, joysticks. Keyboards, inputs from position and/or orientation sensing devices, and the like are all suitable. Any of those devices may be in direct connection with the ATSS, such as through an electrical connection or fiber optic cable, or may communicate with the ATSS through any remote device.

Figure 6:
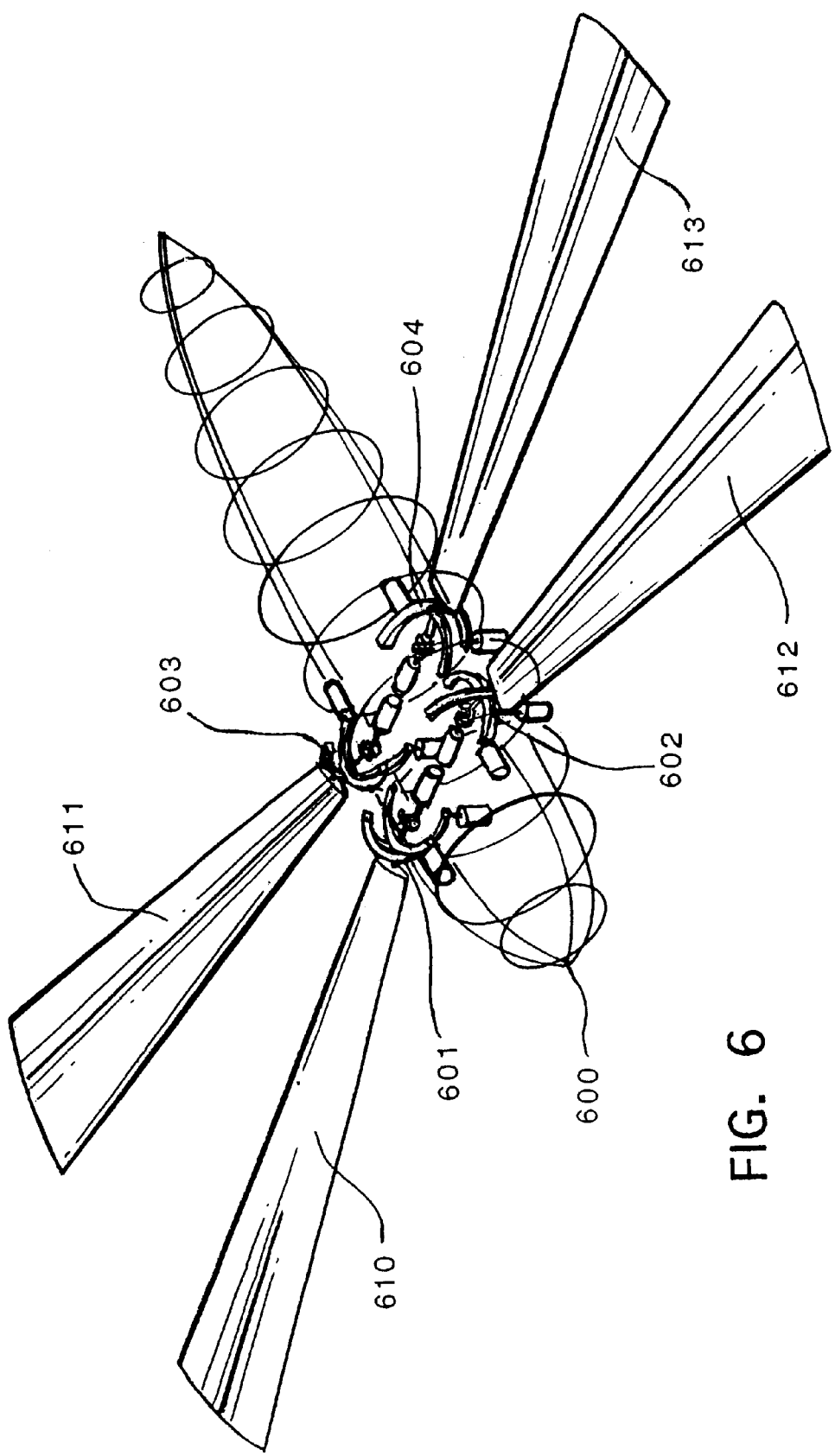
FIG. 6 is an isometric view, partially in section, of a flying vehicle having four wing-drive mechanisms of this invention.

FIG. 6 illustrates a way in which the wing-drive mechanism of this invention can be used to drive a flying vehicle. In the embodiment shown, four wing-drive mechanisms 601, 602, 603 and 604 are used, in opposing pairs of two. A vehicle preferably will have at least two wing-drive mechanisms according to the invention, which are advantageously provided as one or more pairs symmetrically situated on opposing sides of a plane bisecting the fuselage. Embodiments having from one to four or more pairs of wing-drive mechanisms can be made. Of particular interest is a vehicle having at least two pairs of wing drive mechanisms, arranged similarly to the configuration of dragonfly wings, as shown in FIG. 6. By coordinated operation of the pairs of drive wings, unwanted movement of the fuselage 600 in response to movement of the drive wings 610, 611, 612 and 613 or any other disturbance can be minimized. In addition, kinematic studies of pairs of drive wings operating in tandem suggest that improved efficiencies can be achieved in such a manner. See, e.g., Tuncer & Platzer, "Thrust generation due to airfoil flapping", AIAA Journal, vol. 34, No. 2, pp. 324–331 (1966).

Alternatively, a vehicle may have only a single wing-drive mechanism. For example, a single wing-drive mechanism might be employed as a rudder, aileron or elevator system on an otherwise conventional fixed-wing or rotary wing aircraft. In such cases, the wing-drive mechanism can function to provide thrust, stability and/or steering. A single wing-drive mechanism would ordinarily be used in conjunction with other flying technologies, such as a fixed wing or rotary wing, in order to develop lift, additional thrust and/or control.

The movements of multiple wing-drive mechanisms are desirably coordinated in order to impart a desired motion to the vehicle as a whole.

Accordingly, when more than one wing-drive mechanism is present, the trajectory of each drive wing is specified in concert with the trajectory of at least one other drive wing in order to achieve a desired overall vehicle motion. Preferably, any ATSS simultaneously specifies trajectories for at least two drive wings, and more preferably for all drive wings on the vehicle. As discussed before, specification of drive wing trajectories and generation of movement input signals can be generated in real time using the preferred ATSS and non-linear-based controlling functions described before. In this case, the ATSS advantageously specifies trajectories for at least two drive wings, preferably all drive wings, simultaneously in real time, and each drive wing preferably has a separate controller that calculates and generates movement input signals in real time. Of course, simplified controllers as discussed before, that generate previously developed movement input signals upon appropriate instruction, can also be used in multiple drive wing vehicles.

When more than one wing-drive mechanism of the invention is used, the trajectory of each individual drive wing can be related or unrelated to the trajectory of the other drive wing(s). For example, the trajectory of one member of an opposing pair of drive wings may be specified as the mirror image of that of the other member. In such a case, the same sequences of movement input signals may be transmitted to the axis drive mechanisms of each drive wing, and it is even possible that the pair members use shared axis drive mechanisms and/or a shared controller.

However, it is preferred the trajectory of each drive wing can be specified independently of the trajectory of at least one other drive wing, i.e. the trajectory of each wing can be arbitrarily specified in relation to the trajectory of at least one other drive wing. By proper specification of different trajectories for two or more drive wings, maneuvers such as sideways flight, rotation about a stationary vertical axis or other complex maneuvers can be achieved. Thus, in preferred embodiments, the trajectories of each drive wing are specified independently of each other, and most preferably, each wing-drive mechanism operates in response to a separate controller that provides movement input signals having an arbitrary relationship to movement input signals provided to the axis drive mechanisms of any other wing-drive mechanism.

In addition to the controller and ATSS, various monitoring and feedback systems can be added to enhance the performance of the wing-drive mechanism. For example, the input to the axis drive mechanisms can be monitored to determine whether the torques actually delivered by the axis drive mechanisms are as specified. Corresponding signals can then be fed back into the controller or ATSS to effectuate modifications of the movement input signals or to specify an alternative drive wing trajectory. Similarly, the actual versus expected motion of the vehicle can be monitored in various ways to create inputs back into the controller(s) and/or ATSS to effectuate appropriate modifications in drive wing trajectory or movement input signals. Alternatively, these inputs can be fed into a separate trim module that can specify adjustments to the specified drive wing trajectories.

The wing-drive mechanism of this invention can be used in conjunction with other navigational or flight-control systems, such as fixed wings, rotary wings, tails, rudders, stabilizers, rotors, jet or propeller engines, airfoils, and the like. Similarly, the wing-drive mechanism may be modified as needed or desired for particular applications. For example, the wing-drive mechanism may be made such that the drive wing can be fixed in a certain position from time to time in order, for example, to permit the vehicle to glide or perform other specialized maneuvers.

Figure 10:
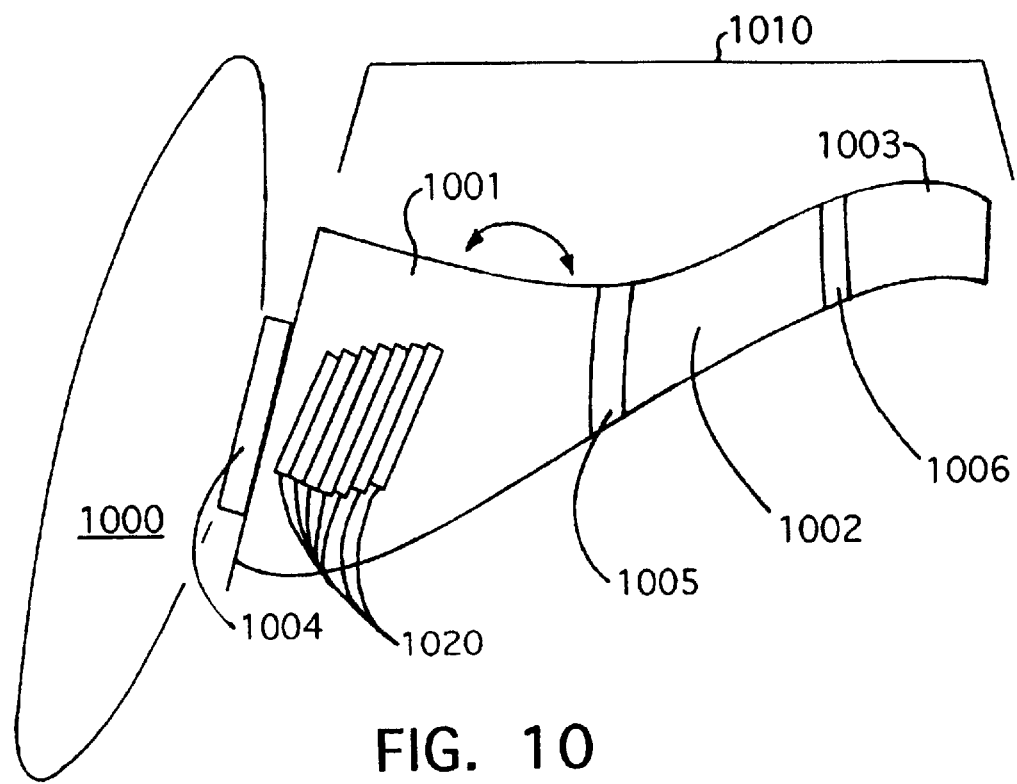
FIG. 10 illustrates a wing complex having a plurality of drive wings interconnected by wing-drive mechanisms of the invention.

In addition, the drive wing mechanism may be used to operate drive wings that extend from other drive wings (which, in turn, may extend from yet other drive wings). An example of such a configuration is shown in FIG. 10. In FIG. 10, drive wing 1001 is connected to fuselage 1000 through wing drive mechanism 1004. Similarly, drive wing 1002 is connected to drive wing 1001 through wing drive mechanism 1005 and drive wing 1003 is connected to drive wing 1002 through wing drive mechanism 1006. In analogy to a human arm, wing drive mechanism 1004 corresponds to a "shoulder", drive wing 1001 corresponds to the upper arm (humerus), wing drive mechanism 1005 corresponds to an "elbow", drive wing 1002 corresponds to the lower arm (radius and ulna), wing drive mechanism 1006 corresponds to a "wrist" and drive wing 1003 corresponds to the hand. The three drive wings 1001, 1002 and 1003 together with wing drive mechanisms 1004, 1005 and 1006 form wing complex 1010.

Control of a wing complex as shown in FIG. 10 is achieved, for example, through an extension of the methods described before. The overall trajectory of the wing complex can be expressed in terms of the trajectories of the individual drive wings 1001, 1002 and 1003, all of which can be expressed in terms of motions about flap, yaw and pitch axes as illustrated in FIG. 3 in an appropriate axis system. Again, all of these can be approximated as periodic trigonometric functions. Thus, for a wing complex having x interconnected drive wings, the trajectory ($f_{wc}(t)$) of the wing complex can be expressed as $$f_{wc}(t) = \begin{bmatrix} f_{dw1}(t) \\ f_{dw2}(t) \\ \vdots \\ f_{dwx}(t) \end{bmatrix} \quad (2)$$

where each $f_{dw}(t)$ represents the trajectory of one of the individual drive wings that make up the wing complex. In turn, each $f_{dw}(t)$ can by represented in terms of angular motions of the corresponding wing-drive mechanism, such as $\phi(t)$, $\theta(t)$, and/or $\psi(t)$ (to use the angular designations shown in FIG. 3). As before, each term fdw(t) can be represented as trigonometric series of the form $$f_{dw}(t) = \frac{a_{odw}}{2} + \sum_{n=1}^{N} \{a_{ndw}\cos(\eta \omega_{ndw} t) + b_{ndw}\sin(\eta \omega_{ndw} t)\} \quad (3)$$

where the values of $a_{odw}$, $a_{ndw}$, $b_{ndw}$, and $\omega_{ndw}$ are unique for each drive wing.

Thus, control of the various wing drive mechanisms can be accomplished using an ATSS as described before, in which desired vehicle movements (i.e., one or more of x, y, z, dx/dt, dy/dt, dz/dt, $d^2x/dt^2$, $d^2y/dt^2$, $d^2z/dt^2$, $\Phi$, $\Theta$, $\Psi$, $d\Phi/dy$, $d\Theta/dy$, $d\Psi/dt$, $d^2\Phi/dt^2$, $d^2\Phi/dt^2$, $d^2\Theta/dt^2$ and $d^2\Psi/dt^2$) are related to specific drive wing trajectories by associating such movements with a set of values for $a_o$, $a_n$, $b_n$ and $\omega_n$ for each $f_{dw}(t)$. As before, once these values are specified for each axis drive mechanism of each wing drive mechanism, the ATSS calculates the values of desired drive wing positions $\phi$, $\theta$, $\psi$ (expressed, for example, as Euler angles), desired drive wing angular velocities $\phi'$, $\theta'$ and $\psi'$ and optionally desired drive wing angular accelerations $\phi''$, $\theta''$ and $\psi''$ for each wing drive mechanism. Signals specifying those values at any time $t_s$ are transmitted to the controller, as before. When there is more than one wing complex on the vehicle, this is performed for each wing complex.

FIG. 10 illustrates yet another optional feature of the invention, the use of piezoelectric actuators or other means (such as motors of the types discussed before) to introduce periodic deformation of a drive wing. This deformation thus supplements the motions imparted by the wing drive mechanisms. As shown in FIG. 10, drive wing 1001 includes piezoelectric actuators 1020. Piezoelectric actuators 1020 may be the actual materials of construction of all or a portion of drive wing 1001. Alternatively, piezoelectric actuators 1020 may be mounted upon a flexible frame or support that makes up drive wing 1001. Piezoelectric actuators are in electrical connection with electrodes (not shown) that also communicate with the controller. When the controller applies a voltage across piezoelectric actuators 1020, said actuators distort in a predetermined direction relative to the orientation of the electrodes. In FIG. 10, the direction of distortion is indicated by arrow E–E'.

Control is achieved through an extension of the methods described before. The overall trajectory of the wing complex can be expressed in terms of the trajectories of the individual drive wings plus the deformation of the drive-wings due to the piezoelectric actuators. The trajectories of the individual drive wings can be expressed in terms of motions about flap, yaw and pitch axes for the wing drive mechanisms and approximated by trigonometric functions as before. The deformations (linear or angular) due to each piezoelectric actuator also can be approximated by periodic trigonometric functions. Thus, for a wing complex structure having X deformable drive wings interconnected with a like number of wing drive mechanisms, the trajectory of the wing complex can be expressed as $$\begin{bmatrix} f_{dw1}(t) \\ g_{dw1,pe1}(t) \\ \vdots \\ g_{dw1,pej}(t) \\ f_{dw2}(t) \\ g_{dw2,pe1}(t) \\ \vdots \\ g_{dw2,pek}(t) \\ \vdots \\ f_{dwx}(t) \\ g_{dwx,pe1}(t) \\ \vdots \\ g_{dwx,pem}(t) \end{bmatrix} \quad (4)$$

where: j, k and m represent the number of piezoelectric actuators on the 1st, 2nd and Xth drive wing, respectively; each $f_{dw}(t)$ function represents $\psi$, $\phi$, $\theta$ for the corresponding drive wing included in the wing complex; and each g(t) function represents the deformation (linear or angular) imparted by the designated piezoelectric actuator.

Again as before, each fdw(t) and g(t) function can be represented by a trigonometric series having the general form of equation 1. Each such function will have unique values of $a_o$, $a_n$, $b_n$ and $\omega$.

Thus control of the various wing drive mechanisms can be accomplished using an ATSS as described before, in which desired vehicle movements (i.e., one or more of x, y, z, dx/dt, dy/dt, dz/dt, $d^2x/dt^2$, $d^2y/dt^2$, $d^2z/dt^2$, $\Phi$, $\Theta$, $\Psi$, $d\Phi/dt$, $d\Theta/dt$, $d\Psi/dt$, $d^2\Phi/dt^2$, $d^2\Theta/dt^2$ and $d^2\Psi/dt^2$) are related to specific drive wing trajectories by associating such movements with a set of values for $a_o$, $a_n$, $b_n$ and $\omega$ for each drive wing and each piezoelectric actuator on each deformable drive wing. As before, once these values are specified for each axis drive mechanism of each wing drive mechanism and each deformable wing, the ATSS calculates the values of desired drive wing positions, desired drive wing angular velocities and optionally desired drive wing angular accelerations for each wing drive mechanism and the piezoelectric actuators (or other drive wing deforming means). Signals specifying those values at any time $t_s$ are transmitted to the controller as before and used to generate signals to the various wing drive mechanisms and actuators.

Figure 11:
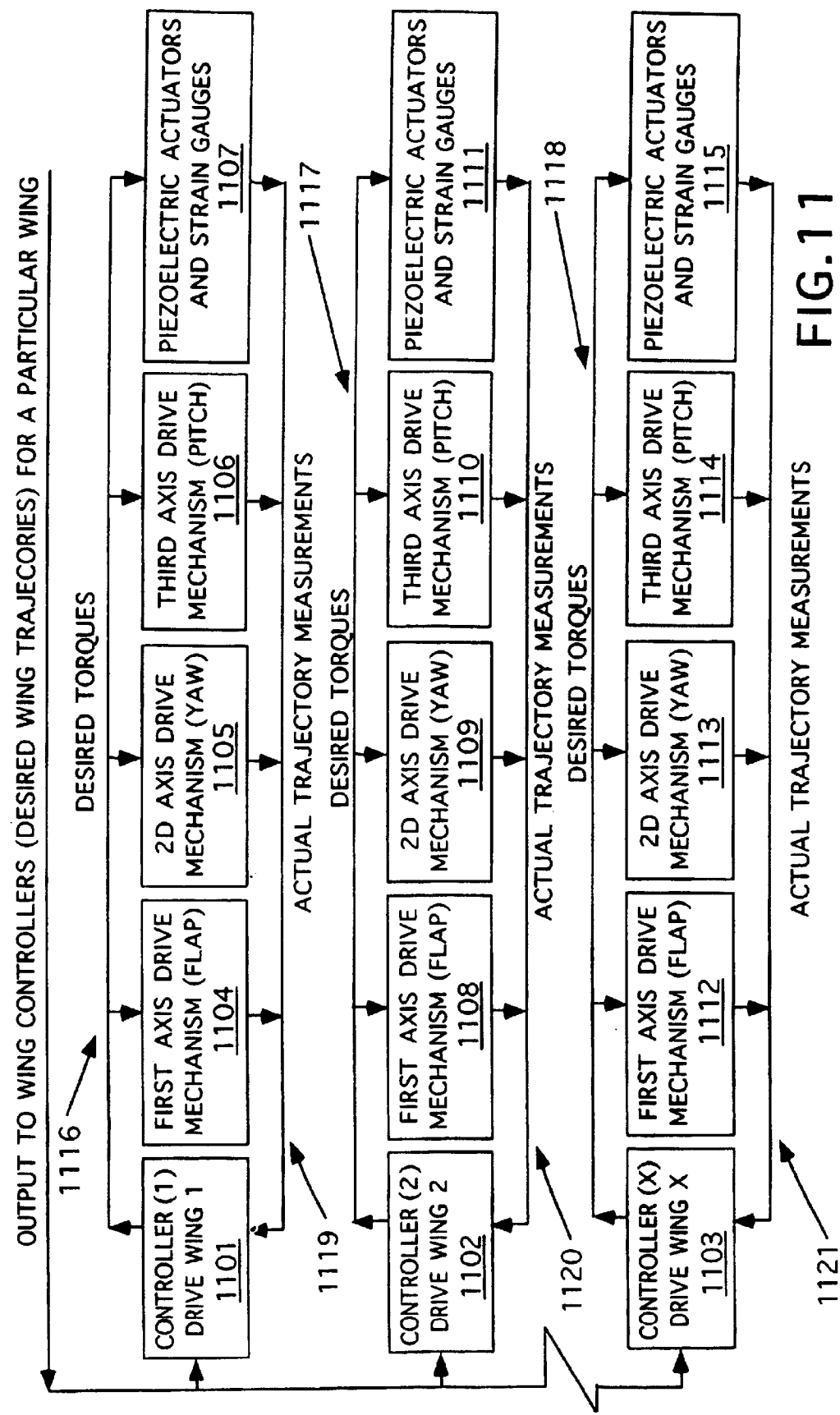
FIG. 11 is a schematic diagram of an automated control system for a wing complex incorporating the wing-drive mechanism of this invention.

FIG. 11 is a schematic of a method of controlling a wing complex having X drive wings, each having piezoelectric actuators. The ATSS specifies a desired trajectory to controllers 1, 2 and X (reference numerals 1101, 1102 and 1103, respectively), which control the motions of drive wings 1, 2 and X that make up the wing complex. Each of the controllers then generates and transmits signals (indicated by lines 1116, 1117 and 1118) corresponding to the torques to be applied by each of the first (1104, 1108, and 1112), second (1105, 1109, 1113) and third (1106, 1110 and 1114) wing-drive mechanisms for that respective wing complex, as well as signals corresponding to the driving force (voltage) for each of the piezoelectric actuators (1107, 1111 and 1115) on that wing complex. Monitoring devices measure actual trajectory or torque measurements and generate reporting signals 1119, 1120 and 1121 back to controllers 1101, 1102 and 1103, respectively.

Note that any particular vehicle, depending on its design, can engage in various "modes" of flight, where each mode of flight is considered to be a desired state of "trimmed" or "trimmable" equilibrium flight, wherein the vehicle will tend to remain or wherein the vehicle is more easily dynamically balanced. Thus, a vehicle that is acted upon by an atmospheric disturbance or willful control will often tend to revert back to a trimmed state (either the original trimmed state or a new one) once the disturbance or control ceases. Thus, for example, an ornithopter as described before may have several modes of flight such as longitudinal (forwards/backwards), lateral (left/right), vertical (up/down), diagonal (8 directions), glide (longitudinal or lateral), all in which the attitude of the fuselage is parmount. A conventional vehicle might have modes corresponding to forwards, rolling, pitching and yawing, where the attitude of the fuselage is not paramount. A helicopter-like vehicle might have modes of hover, longitudinal, lateral, vertical and diagonal, and a glider might have modes of longitudinal and lateral. Hybrid vehicles might have combinations of these modes of flight.

These states of trimmed equilibrium flight provide a basis for simplifying the control laws which the ATTS employs to generate control signals. For any trimmable state, a set of trajectories for the drive wings can be developed that will cause the vehicle to attain or approximate that trimmable state. In the case where the trajectories are expressed as Fourier series (such as per equation 1 above), the drive wing trajectories that relate to that trimmable state can be related to values for the coefficients $a_{of}$, each $a_{nf}$, each $b_{nf}$ and $\omega_f$ for each wing-drive mechanism. A further simplification that can be made sometimes is to specify a common first harmoic frequency for all wing-drive mechanisms, i.e., $\omega f$ is the same for all wing-drive mechanisms.

For any particular mode of flight, the values of the control parameters $u_m$ will of course depend on particular design variables of the vehicle as well as the drive frequency $\omega$ and the vehicle velocity and direction. The design variables include such things as vehicle body mass and inertia tensors, wing mass and inertia tensors, drive-wing mass balance tensors, vehicle center of gravity, number and placement of drive-wings, drive-wing fail-safe features, plan-form shape of the drive wings, profile shape of the drive-wings, leading-edge and trailing-edge wing profiles, wing-root fore-aft spacing, wing root side-by-side spacing, wing flexibility, wing materials, body materials, power source and placment, sensor type and placement, and the like.

For any trimmable state for any vehicle, values of the coefficients $a_{of}$, $a_{nf}$, $b_n$ and $\omega$ for each wing-drive mechanism may be developed empirically, through modelling techniques, or through other convenient methods. This is done below for two trimmable states (hover/vertical motion and forward/lateral motion trimmed state) of an ornithopter as illustrated in FIG. 6, using the following assumptions:

| | |
|---|---|
| Vehicle weight: | 45N |
| Wingspan | 1.3 m |
| Root chord | 0.1 m |
| Tip chord | 0.26 m |
| Fore-aft wing spacing at root wing-drive mounts | 0.3 m |
| Wing section | NACA 0004 |
| Wings shape | trapezoidal |
| Vehicle length | 1.1 m |
| Center of gravity | below the plane of the wing-drives and midway between them |
| 4 symmetrically arranged wings | |
| Velocity | 0 |
| $\omega_f$ (all wings) | 10 Hz |

For a trimmable hover/vertical motion state for this vehicle, modelled values of the coefficients are as follows, with wings 612 and 610 behaving symmetrically with respect to wings 613 and 611, and wings 612 and 611 behaving symmetrically with respect to wings 610 and 613:

$\omega$ = 10 Hz
Vel = 0 m/s

| | $\theta$(rad) | $\Psi$(rad) | $\phi$(rad) |
|---|---|---|---|
| $a_0$ | 4.4070E − 01 | 6.0185E − 02 | −9.2367E − 01 |
| $a_{10}$ | 1.7803E − 03 | 5.9556E − 01 | −5.3448E − 01 |
| $a_{20}$ | 2.1260E − 03 | −1.0713E − 02 | 5.9074E − 02 |
| $a_{30}$ | −1.1123E − 03 | 2.3693E − 02 | −7.7923E − 03 |
| $a_{40}$ | 3.4444E − 04 | −1.1966E − 02 | 6.6704E − 03 |
| $b_1$ | 4.9045E − 02 | 3.9841E − 02 | −4.9372E − 01 |
| $b_2$ | −7.9829E − 03 | 6.5933E − 02 | 7.0757E − 02 |
| $b_3$ | 6.6986E − 03 | 5.1714E − 03 | 4.3731E − 03 |
| $b_4$ | −5.6890E − 03 | −3.7411E − 03 | 3.3549E − 03 |

These coefficients can be expressed in magnitude phase-angle form as:

$\omega$ = 10 Hz
Vel = 0 m/s

| | $\theta$(rad) | $\Psi$(rad) | $\phi$(rad) |
|---|---|---|---|
| $a_0$ | 4.4070E − 01 | 6.0185E − 02 | −9.2367E − 01 |
| $a_{10}$ | 4.9077E − 03 | 5.9557E − 01 | 7.2762E − 01 |
| $a_{20}$ | 8.2611E − 03 | 6.5811E − 02 | 9.2175E − 02 |
| $a_{30}$ | 6.7903E − 03 | 2.4251E − 02 | 8.9360E − 03 |
| $a_{40}$ | 5.6994E − 03 | 1.2537E − 02 | 7.4666E − 03 |
| $b_1$ | 1.5345E + 00 | 6.6896E − 03 | −2.3985E + 00 |
| $b_2$ | −1.3105E + 00 | 1.7343E + 00 | 8.7514E − 01 |

-continued

| | $\omega = 10$ Hz<br>Vel = 0 m/s | | |
|---|---|---|---|
| | $\theta$(rad) | $\Psi$(rad) | $\phi$(rad) |
| $\underline{b}_3$ | 1.7353E + 00 | 2.1490E − 01 | 2.6302E + 00 |
| $\underline{b}_4$ | −1.5103E + 00 | −2.8386E + 00 | 4.6601E − 01 | where $$\underline{a}10 = \sqrt{a_1^2 + b_1^2}$$

and $$\underline{b_i} = \tan^{-1}\left(\frac{b_i}{a_i}\right)$$

For a forward/lateral motion trimmed state for this vehicle, modelled values of the coefficients are:

| | $\omega = 10$ Hz<br>Vel = 0 m/s | | |
|---|---|---|---|
| | $\theta$(rad) | $\Psi$(rad) | $\phi$(rad) |
| $a_0$ | 3.6346E − 01 | 2.4215E − 01 | 9.8923E − 01 |
| $a_{10}$ | −1.1408E − 01 | 5.7567E − 01 | 5.6615E − 01 |
| $a_{20}$ | −1.1780E − 02 | −5.3141E − 04 | −2.8015E − 02 |
| $a_{30}$ | −2.8443E − 02 | 2.0040E − 02 | −5.3134E − 02 |
| $a_{40}$ | −4.5493E − 04 | −3.3825E − 02 | −7.6451E − 03 |
| $b_1$ | 2.4979E − 01 | 4.9010E − 02 | −5.2288E − 01 |
| $b_2$ | 8.9825E − 02 | 6.3996E − 02 | 9.5762E − 02 |
| $b_3$ | 5.3145E − 02 | −1.5288E − 02 | 1.3901E − 02 |
| $b_4$ | 1.2957E − 02 | −5.5348E − 03 | −4.4363E − 03 |

Or, in magnitude phase angle form:

| | $\omega = 10$ Hz<br>Vel = 0 m/s | | |
|---|---|---|---|
| | $\theta$(rad) | $\Psi$(rad) | $\phi$(rad) |
| $a_0$ | 3.6346E − 01 | 2.4215E − 01 | −9.8923E − 01 |
| $\underline{a}_{10}$ | 2.7461E − 01 | 5.7775E − 01 | 7.7067E − 01 |
| $\underline{a}_{20}$ | −9.0594E − 02 | 6.3998E − 02 | 9.9776E − 02 |
| $\underline{a}_{30}$ | 6.0278E − 02 | 2.5206E − 02 | 5.4922E − 02 |
| $\underline{a}_{40}$ | −1.2965E − 02 | 3.4275E − 02 | −8.8390E − 03 |
| $\underline{b}_1$ | 1.9992E + 00 | 8.4932E − 02 | −2.3959E + 00 |
| $\underline{b}_2$ | −1.4404E + 00 | 1.5791E + 00 | 1.8554E + 00 |
| $\underline{b}_3$ | 2.0622E + 00 | −6.5169E − 01 | 2.8857E + 00 |
| $\underline{b}_4$ | −1.5357E + 00 | −2.9794E + 00 | 5.25791E − 01 | with wings 612 and 610 being ahead of wings 613 and 611 by some suitable phase difference (90°, optimally) in order to achieve forward flight while still maintaining sufficient lift to sustain the weight of the vehicle.

Similarly, additional sets of coefficients can be developed for other trimmable states.

Any trimmable state will have associated with it a specific orientation in space, i.e. specific values for $\Phi$, $\Theta$, $\Psi$ that will exist when the vehicle is in the trimmed state. Errors in $\Phi$, $\Theta$, $\Psi$ (and/or time derivatives of these) thus can form the basis for making adjustments in the trajectories of the drive wings to restore the vehicle to a trimmed state if it is diverted from that state either by environmental factors (wind gusts, etc.) or purposefully. When drive-wing trajectories are computed using Fourier series functions as described before, this is most preferably achieved by specifying changes in the coefficients $a_{of}$, $a_{nf}$, and $b_{nf}$ and also the frequency $\omega_f$.

As mentioned before, a preferred ATSS employs fuzzy logic methods or a neural network. These control methods are conveniently based upon control laws that represent the relationship between the difference in the desired and actual motion of the vehicle, and the control parameters that govern the forced movement of each actuated joint in each wing-drive mechanism on the vehicle. This can be represented as $$\{u\}_m = h[\Delta x]_m \quad (5)$$

where $\{u\}_m$ is a set of control parameters for affecting a particular mode m of flight, $\Delta x$ represents the difference between the desired and actual movement of the vehicle, and h is a non-linear function.

The various flight modes for a vehicle can provide a basis for developing more simplified and tractable control laws, as, for regions within or close to a trimmed stated, the function $h[\Delta x]$ can be assumed to be linear or close to linear, i.e. can be represented as $$\{u\}_m = [Z]_m [\Delta x]_m \quad (6)$$

where $[Z]_m$ represents a set of control laws that relate the difference in desired and actual movement to specific control parameters. $\{u\}_m$ will consist of control parameters for each axis drive mechanism on each wing-drive mechanism on the vehicle (as well as any pizeoelectric actuators that may be used). When the desired drive wing trajectory is expressed as a Fourier series such as equation (1), the control parameters $\{u\}$ can each be created by generating values for $a_{of}$, $a_{nf}$, $b_{nf}$ and $\omega_f$ for each f(t) (i.e., $\phi$(t), $\theta$(t), and $\psi$(t)) for each wing drive mechanism. $[\Delta x]_m$ is suitably expressed in one or more of x, y, z, dx/dt, dy/dt, dz/dt, $d^2x/dt^2$, $d^2y/dt^2$, $d^2z/dt^2$, $\Phi$, $\Theta$, $\Psi$, $d\Phi/dy$, $d\Theta/dy$, $d\Psi/dt$, $d^2\Phi/dt^2$, $d^2\Theta/dt^2$ and $d^2\Psi/dt^2$, as discussed before. The control laws $[Z]_m$ associate $[\Delta x]_m$ such movements with a set of values for $a_{of}$, $a_{nf}$, $b_{nf}$ and $\omega_f$.

For any vehicle, the control laws suitably consist of a set of laws for each actuator and each mode of flight, as follows:

$$[Z_{ij}] = \begin{bmatrix} [Z_{11}] & \cdots & [Z_{1j}] & \cdots & [Z_{1q}] \\ \vdots & & \vdots & & \vdots \\ [Z_{i1}] & \cdots & [Z_{ij}] & \cdots & [Z_{iq}] \\ \vdots & & \vdots & & \vdots \\ [Z_{k1}] & \cdots & [Z_{kj}] & \cdots & [Z_{kq}] \end{bmatrix}$$

wherein i represents a particular actuator, k represents the total number of actuators, j represents a particular mode of flight and q represents the total number of trimmable modes of flight the vehicle can attain. Any particular control law [Zij] will relate a particular control parameter for a specific actuator i to a specific $\Delta x$ value for mode of flight j.

To simplify matters further, control parameters and control laws may be simplified if some subset of the motion parameters, such as the velocity terms (dx/dt, dy/dt, dz/dt, $d\Phi/dt$, $d\Theta/dt$ and $d\Psi/dt$) or position, orientation and velocity terms (x, y, z, $\Phi$, $\Theta$ and $\Psi$, dy/dt, dz/dt, $d\Phi/dt$, $d\Theta/dt$ and $d\Psi/dt$) are used to develop control parameters. The foregoing relationship between control parameters and the difference between desired and actual motion can be reduced to $$\{u\}_m = [Z][\Delta x] \quad (8)$$

where x is based on a reduced control sensor set given by the velocity terms dx/dt, dy/dt, dz/dt, $d\Phi/dt$, $d\Theta/dt$ and $d\Psi/dt$ and $\{u\}_m = \{u_1 \ldots u_i \ldots u_k \omega\}_m$ for a common first harmonic frequency o for all joints. From this relationship, linearized equations of motion describing the overall forces acting on the vehicle in a trimmed state are given by $$d[\Delta x]/dt = \{[A]+[B][Z]\}\{\Delta x\} \qquad (9)$$

where $\{[A]+[B][Z]\}$ is the matrix of stability derivatives for the vehicle in each mode of flight.

Thus, a rule base for a fuzzy logic controller may use error and rate error to determine the control parameters $\{u\}_m$. Error is taken as the difference between current position (x, y, z) and/or orientation ($\Phi$, $\Theta$, $\Psi$) and the desired position and/or orientation. Rate error is taken as the difference between the current velocity (dx/dt, dy/dt, dz/dt) and/or rate of change of orientation (d$\Phi$/dt, d$\Theta$/dt and d$\Psi$/dt) and desired velocity and/or rate of change of orientation. These data can be obtained using on-board and/or external sensing devices as described before.

Membership rules correlate measured error and rate error values into sets of fuzzy variables. A relatively simple and tractable system might include, for example five fuzzy variables for each control parameter: large negative (LN), small negative (SN), zero (ZE), small positive (SP) and large positive (LP). These variables can be used to define both inputs and outputs of a fuzzy logic controller. Other numbers of fuzzy variables can be used to develop simpler or more complex control systems. Examples of how measured error and rate error values for pitch and roll can be formed into fuzzy variables are shown graphically below. Table 2C illustrates how required changes in pitch and roll can be specified as fuzzy variables.

TABLE 1A

Membership Functions for Measured Vehicle Pitch ($\Theta$) and Roll ($\phi$) Values

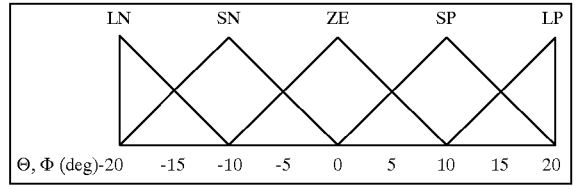

TABLE 1B

Membership Functions for Measured Vehicle Pitch ($\Theta$) and Roll ($\phi$) Velocities

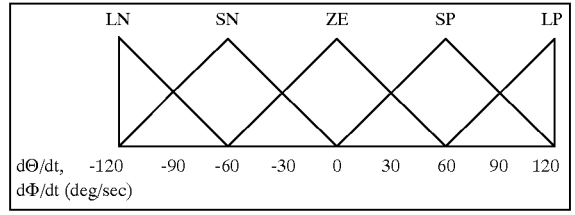

TABLE 1C

Membership Functions for Pitch ($\Theta$) and Roll ($\phi$) Control Outputs

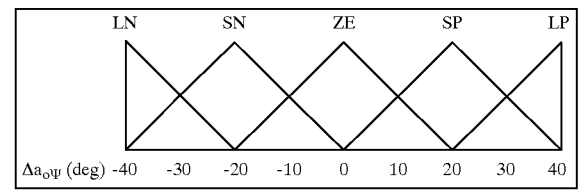

Examples of how measured error and rate error values for yaw can be formed into fuzzy variables are shown graphically below. Table 2C illustrates how required changes in yaw can specified as fuzzy variables.

TABLE 2A

Membership Functions for Measured Vehicle Yaw ($\psi$) Values

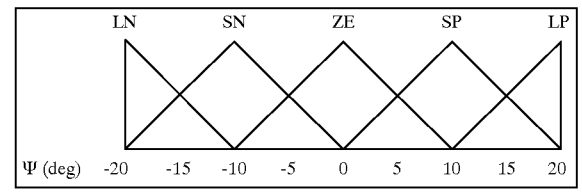

TABLE 2B

Membership Functions for Measured Vehicle Yaw ($\psi$) Velocities

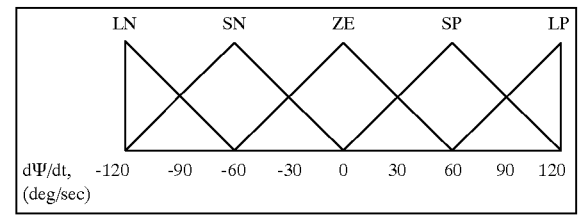

TABLE 2C

Membership Functions for Yaw ($\psi$) Control Outputs

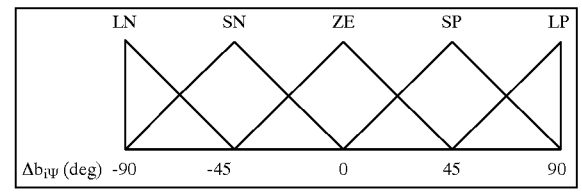

Thus, for example, in Table 1A, measured values of $\Phi$ and $\Theta$ are scaled and assigned into fuzzy sets according to membership rules. The same is done in Table 1B, for measured rates of change of these values. In Table 1C, outputs to the controller on a first order basis are specified as the value of the coefficient $a_\psi$ for each of the drive wings, which are also assigned into fuzzy sets. If desired, the outputs can also include second order coefficients $a_{nf}$, $b_{nf}$ and the frequency $\omega$. Thus, the output of the fuzzy logic controller is a fuzzy value that specifies one or more of the coefficients $a_o$, $a_{nf}$, $b_{nf}$ and the frequency ω for each drive wing.

In Table 2C, the output is expressed on a first order basis as a phase lag (optimally 90°) of the wing drive ψ, θ and φ control angles of each of wings 612 and 613 and an opposite phase lag of the control angles of the opposing wings 610 and 611. Other variables that can be drawn upon on a second order basis in various combinations to either achieve the same effect or modify it are a corresponding phase lag arrangement between wings 612 and 610 and between wings 613 and 611.

The fuzzy logic controller will apply a set of if-then rules to correlate measured error and rate error values for pitch, roll and yaw to generate fuzzy outputs which will restore the vehicle to a trimmable state. An exemplary set of if-then rules relating to pitch rate and angle can be represented as in Table 3 (rest of page intentionally blank)

TABLE 3

| $\Delta a_{o\psi}$ | | | | | | | | | | | |
|---|---|---|---|---|---|---|---|---|---|---|---|
| Wing 612 | Wing 610 | | | | $\Delta(d\Theta/dt)$ | | | | | | |
| Wing 613 | Wing 611 | LN | | SN | | ZE | | SP | | LP | |
| ΔΘ | LN | LN | LP | LN | LP | LN | LP | LN | LP | LN | LP |
|  |  | LN | LP | LN | LP | LN | LP | LN | LP | LN | LP |
|  | SN | LN | LP | SN | SP | SN | SP | SN | SP | ZE | ZE |
|  |  | LN | LP | SN | SP | SN | SP | SN | SP | ZE | ZE |
|  | ZE | LN | LP | SN | SP | ZE | ZE | SP | SN | LP | LN |
|  |  | LN | LP | SN | SP | ZE | ZE | SP | SN | LP | LN |
|  | SP | ZE | ZE | SP | SN | SP | SN | SP | SN | LP | LN |
|  |  | ZE | ZE | SP | SN | SP | SN | SP | SN | LP | LN |
|  | LP | LP | LN | LP | LN | LP | LN | LP | LN | LP | LN |
|  |  | LP | LN | LP | LN | LP | LN | LP | LN | LP | LN |

For example, according to Table 3, if the error in Θ and in dΘ/dt are both large negative, the output of the controller will be to make a large negative adjustment to the coefficient $a_{o\psi}$ for wings 612 and wings 613, and a large positive adjustment for the coefficient $a_{o\psi}$ for wings 611 and 610. If the errors are zero, then the controller output will be to make no changes to the coefficients $a_{o\psi}$ for any of the wings. If the error in Θ is small positive and the error in dΘ/dt is small negative, then the output of the controller will be to make small positive changes in the coefficient $a_{o\psi}$ for wings 612 and 613 and small negative changes for wings 611 and 610.

An exemplary set of if-then rules relating to roll rate and angle can be represented as in Table 4

TABLE 4

| $\Delta a_{o\psi}$ | | | | | | | | | | | |
|---|---|---|---|---|---|---|---|---|---|---|---|
| Wing 612 | Wing 610 | | | | $\Delta(d\Phi/dt)$ | | | | | | |
| Wing 613 | Wing 611 | LN | | SN | | ZE | | SP | | LP | |
| ΔΦ | LN | LN | LP | LN | LP | LN | LP | LN | LP | LN | LP |
|  |  | LN | LP | LN | LP | LN | LP | LN | LP | LN | LP |
|  | SN | LN | LP | SN | SP | SN | SP | SN | SP | ZE | ZE |
|  |  | LN | LP | SN | SP | SN | SP | SN | SP | ZE | ZE |
|  | ZE | LN | LP | SN | SP | ZE | ZE | SP | SN | LP | LN |
|  |  | LN | LP | SN | SP | ZE | ZE | SP | SN | LP | LN |
|  | SP | ZE | ZE | SP | SN | SP | SN | SP | SN | LP | LN |
|  |  | ZE | ZE | SP | SN | SP | SN | SP | SN | LP | LN |
|  | LP | LP | LN | LP | LN | LP | LN | LP | LN | LP | LN |
|  |  | LP | LN | LP | LN | LP | LN | LP | LN | LP | LN |

For example, according to Table 4, if the error in Φ and in dΦ/dt are both large negative, the output of the controller will be to make a large negative adjustment to the coefficient $a_{o\psi}$ for wings 611 and wings 613, and a large positive adjustment for the coefficient $a_{o\psi}$ for wings 612 and 610. If the errors are zero, then the controller output will be to make no changes to the coefficients $a_{o\psi}$ for any of the wings. If the error in Φ is small positive and the error in dΦ/dt is small negative, then the output of the controller will be to make small positive changes in the coefficient $a_{o\psi}$ for wings 611 and 613 and small negative changes for wings 612 and 610.

An exemplary set of if-then rules relating to yaw rate and angle can be represented as in Table 5.

TABLE 5

| | | $\Delta(d\psi/dt)$ | | | | |
|---|---|---|---|---|---|---|
| | | LN | SN | ZE | SP | LP |
| Phase Lags $b_i$ Between Wings 610, 611 | | | | | | |
| Δψ | LN | LP | LP | LP | LP | LP |
|  | SN | LP | SP | SP | SP | ZE |
|  | ZE | LP | SP | ZE | SN | LN |
|  | SP | ZE | SN | SN | SN | LN |
|  | LP | LN | LN | LN | LN | LN |
| Phase Lags $b_i$ Between Wings 612, 613 | | | | | | |
| Δψ | LN | LN | LN | LN | LN | LN |
|  | SN | LN | SN | SN | SN | ZE |
|  | ZE | LN | SN | ZE | SP | LP |
|  | SP | ZE | SP | SP | SP | LP |
|  | LP | LP | LP | LP | LP | LP |

For example, according to Table 5, if the error in Ψ and in dΨ/dt are both large negative, the output of the controller will be to make a large negative adjustment to the phase lag between wings 612 and wings 613, and a large positive adjustment to the phase lag between wings 610 and 611. If the errors are zero, then the controller output will be to make no changes to the phase lags. If the error in Ψ is small positive and the error in dΨ/dt is small negative, then the output of the controller will be to make a small negative change to the phase lag between wings 610 and 611 and small positive change in phase lag between wings 612 and 613.

Adjustments to longitudinal, lateral and vertical position and velocity can be made in analogous way. Changes in longitudinal position and velocity can use as inputs error in x and dx/dt, with a suitable output being, on a first order basis, taken as a phase lag (optimally 90° for maximum thrust) of the wing drive ψ, θ and φ control angles for each of wings 612 and 613 and corresponding phase lags of the control angles for the opposing wings 610 and 611. A suitable set of if-then rules can be expressed as in Table 6

TABLE 6

| | | $\Delta(dX/dt)$ | | | | |
|---|---|---|---|---|---|---|
| | | LN | SN | ZE | SP | LP |
| Phase Lags $b_i$ Between Wings 612, 613 | | | | | | |
| ΔX | LN | LN | LN | LN | LN | LN |
|  | SN | LN | LN | SN | SN | ZE |
|  | ZE | LN | SN | ZE | SP | LP |

TABLE 6-continued

| $\Delta(dX/dt)$ | | | | | | |
|---|---|---|---|---|---|---|
| | | LN | SN | ZE | SP | LP |
| | SP | ZE | SP | SP | SP | LP |
| | LP | LP | LP | LP | LP | LP |
| Phase Lags $b_i$ Between Wings 610, 611 | | | | | | |
| $\Delta X$ | LN | LN | LN | LN | LN | LN |
| | SN | LN | SN | SN | SN | ZE |
| | ZE | LN | SN | ZE | SP | LP |
| | SP | ZE | SP | SP | SP | LP |
| | LP | LP | LP | LP | LP | LP |

For example, according to Table 6, if the error in x and in dx/dt are both large negative, the output of the controller will be to make a large negative adjustments to the phase lag between wings 612 and 613 and to the phase lag between wings 610 and 611. If the errors are zero, then the controller output will be to make no changes to phase lags. If the error in x is small positive and the error in dx/dt is small negative, then the output of the controller will be to make a small positive change to the phase lags between wings 612 and 613 and between wings 610 and 611.

Changes in lateral position and velocity can use as inputs error in y and dy/dt, with a suitable output being, on a first order basis, taken as a phase lag (optimally 90° for maximum thrust) of the wing drive $\psi$, $\theta$ and $\phi$ control angles for each of wings 612 and 610 and corresponding phase lags of the control angles for the opposing wings 613 and 611. A suitable set of if-then rules can be expressed as in Table 7

TABLE 7

| $\Delta(dY/dt)$ | | | | | | |
|---|---|---|---|---|---|---|
| | | LN | SN | ZE | SP | LP |
| Phase Lags $b_i$ Between Wings 610, 611 | | | | | | |
| $\Delta Y$ | LN | LN | LN | LN | LN | LN |
| | SN | LN | SN | SN | SN | ZE |
| | ZE | LN | SN | ZE | SP | LP |
| | SP | ZE | SP | SP | SP | LP |
| | LP | LP | LP | LP | LP | LP |
| Phase Lags $b_i$ Between Wings 612, 613 | | | | | | |
| $\Delta Y$ | LN | LN | LN | LN | LN | LN |
| | SN | LN | SN | SN | SN | ZE |
| | ZE | LN | SN | ZE | SP | LP |
| | SP | ZE | SP | SP | SP | LP |
| | LP | LP | LP | LP | LP | LP |

For example, according to Table 7, if the error in y and in dy/dt are both large negative, the output of the controller will be to make a large negative adjustments to the phase lag between wings 612 and 610 and to the phase lag between wings 613 and 611. If the errors are zero, then the controller output will be to make no changes to phase lags. If the error in x is small positive and the error in dx/dt is small negative, then the output of the controller will be to make a small positive change to the phase lags between wings 612 and 610 and between wings 613 and 611.

Changes in vertical position and velocity can use as inputs error in z and dy/dt, with a suitable output being, on a first order basis, taken as the mean $a_{o,\psi}$ of each of the wing drive $\psi$ control angles of each of the forward two wings (612 and 610) and of each of the aft two wings (613 and 611). Other variables that can be drawn upon on a second order basis in various combinations to either achieve the same effect or modify it are second order coefficients $a_{nf}$, $b_{nf}$ and the frequency $\omega$ for each of the wings. A suitable set of if-then rules can be expressed as in Table 8

TABLE 8

| | $\Delta a_{o,\psi}$ | | | | | |
|---|---|---|---|---|---|---|
| Wing 612 | Wing 610 | | | $\Delta(dZ/dt)$ | | |
| Wing 613 | Wing 611 | LN | SN | ZE | SP | LP |
| $\Delta Z$ | LN | LN LP | LN LP | LN LP | LN LP | LN LP |
| | | LN LP | LN LP | LN LP | LN LP | LN LP |
| | SN | LN LP | SN SP | SN SP | SN SP | ZE ZE |
| | | LN LP | SN SP | SN SP | SN SP | ZE ZE |
| | ZE | LN LP | SN SP | ZE ZE | SP SN | LP LN |
| | | LN LP | SN SP | ZE ZE | SP SN | LP LN |
| | SP | ZE ZE | SP SN | SP SN | SP SN | LP LN |
| | | ZE ZE | SP SN | SP SN | SP SN | LP LN |
| | LP | LP LN | LP LN | LP LN | LP LN | LP LN |
| | | LP LN | LP LN | LP LN | LP LN | LP LN |

For example, according to Table 8, if the error in z and in dz/dt are both large negative, the output of the controller will be to make a large negative adjustment to the coefficient $a_{o,\psi}$ for wings 612 and wings 611, and a large positive adjustment for the coefficient $a_{o,\psi}$ for wings 610 and 613. If the errors are zero, then the controller output will be to make no changes to the coefficients $a_{o,\psi}$ for any of the wings. If the error in z is small positive and the error in dz/dt is small negative, then the output of the controller will be to make small positive changes in the coefficient $a_{o,\psi}$ for wings 612 and 611 and small negative changes for wings 610 and 613.

It will be appreciated that many modifications can be made to the wing-drive mechanism as described herein without departing from the spirit of the invention, the scope of which is defined by the appended claims. For example, redundant systems may be employed as a hedge against failure of a particular component.

A flying vehicle according to this invention can be used, for example, as a surveillance vehicle, an inspection vehicle, a search-and-rescue vehicle or as a cargo or passenger vehicle, or even as a toy, depending on the particular size and design. A flying vehicle according to the invention can be made on a very small scale (wingspan of six inches or less), an intermediate scale (wingspan from six inches to 12 feet), or a large scale (wingspan greater than 12 feet). It can be manned or unmanned (i.e., a drone). A watercraft employing the wing-drive mechanism of this invention can, with suitable insulation, be used as a submersible or surface vessel. Similarly, a spacecraft or satellite can be used for exploration, telecommunications, surveillance and the like.

What is claimed is:

1. A wing-drive mechanism for a vehicle having a fuselage, comprising
   a) a drive wing having an adjustable pitch relative to said fuselage and being moveable relative to said fuselage about yaw and flap axes;
   b) a first axis drive mechanism for moving said drive wing about said flap axis in response to a first movement input signal,
   c) a second axis drive mechanism for moving said drive wing about said yaw axis in response to a second movement input signal, wherein said second axis drive mechanism operates independently of said first axis drive mechanism and d) a third axis drive mechanism for adjusting the pitch of said drive wing in response to a third movement input signal, wherein said third axis drive mechanism operates independently of said first and second axis drive mechanisms, wherein said first, second and third movement input signals are generated by a controller that calculates said first, second and third movement input signals in real time using a controlling function that relates a desired drive wing trajectory and an actual drive wing trajectory to torques to be applied by each of said first, second and third axis drive mechanisms.

2. The wing-drive mechanism of claim 1, wherein said desired drive wing trajectory and said actual drive wing trajectory are specified as drive wing orientation parameters, drive wing rate of change orientation parameters, drive wing rate of change of rate of change of orientation parameters, or a combination of two or more of these.

3. The wing-drive mechanism of claim 2, wherein said desired drive wing trajectory and said actual drive wing trajectory are specified to the controller by an automated trajectory specification system.

4. The wing-drive mechanism of claim 3, wherein said desired drive-wing trajectory and said actual drive wing trajectory are specified to the controller as one or more values representing the difference between said desired drive-wing trajectory and said actual drive wing trajectory.

5. The wing-drive mechanism of claim 3, wherein said automated trajectory specification system generates said desired drive wing trajectory by comparing inputted actual and desired data that is selected from the group consisting of vehicle position, velocity, acceleration, orientation, rate of change of orientation, rate of change of rate of change of orientation and combinations of two or more thereof.

6. The wing-drive mechanism of claim 1, wherein said first, second and third movement input signals are electrical, sonic or electromagnetic signals, and said first, second and third axis drive mechanisms each comprise a means for receiving said first, second and third movement input signals, respectively, and applying torque to said drive wing in response to said first, second and third input signals.

7. The wing-drive mechanism of claim 1, wherein said automated trajectory specification system includes a fuzzy logic processor or a neural network.

8. A method of controlling a wing-drive mechanism for a vehicle having a fuselage, the wing drive mechanism including a drive wing having an adjustable pitch relative to said fuselage and which is moveable relative to said fuselage about yaw and flap axes; a first axis drive mechanism for moving said drive wing about said flap axis in response to a first movement input signal; a second axis drive mechanism for moving said drive wing about said yaw axis in response to a second movement input signal, wherein said second axis drive mechanism operates independently of said first axis drive mechanism, and a third axis drive mechanism for adjusting the pitch of said drive wing in response to a third movement input signal, wherein said third axis drive mechanism operates independently of said first and second axis drive mechanisms, said method comprising a) inputting a desired drive wing trajectory into a controller including a computer that is programmed to calculate said first, second and third movement input signals using a controlling function that relates a desired drive wing trajectory and an actual drive wing trajectory to torques to be applied by each of said first, second and third axis drive mechanisms, b) using said controller, generating said first, second and third movement signals in real time, and c) transmitting said first, second and third movement signals to said first, second and third axis drive mechanisms, respectively, whereby said first, second and third axis drive mechanisms affect movement of the drive wing in the desired trajectory in response to said first, second and third input signals.

9. The wing-drive mechanism of claim 8, wherein said desired drive wing trajectory and said actual drive wing trajectory are specified as drive wing orientation parameters, drive wing rate of change orientation parameters, drive wing rate of change of rate of change of orientation parameters, or a combination of two or more of these.

10. The method of claim 9, wherein said desired drive wing trajectory is specified in real time by an automated trajectory specification system that generates said desired drive wing trajectory by comparing inputted actual and desired data that is selected from the group consisting of vehicle position, velocity, acceleration, orientation, rate of change of orientation, rate of change of rate of change of orientation, and combinations of two or more thereof.

11. The method of claim 10, wherein said automated trajectory specification system includes a fuzzy logic processor.

12. The method of claim 10, wherein said automated trajectory specification system includes a neural network.

13. The method of claim 8, wherein said vehicle has at least two wing-drive mechanisms, and said automated trajectory specification system simultaneously generates desired drive wing trajectories for at least two drive-wings on said vehicle.

14. A method of controlling the wing-drive mechanism of claim 1, said method comprising a) developing two or more sets of coordinated movement input signals, each such set corresponding to a specific drive wing trajectory and including first, second and third movement input signals;

b) recording each set of coordinated first, second and third movement input signals;

c) inputting a desired drive wing trajectory into a controller that is adapted to access said recorded coordinated sets of movement input signals and generate a set of first, second and third movement input signals that correspond to the desired drive wing trajectory and d) using said controller, generating and transmitting a set of first, second and third movement input signals corresponding to said desired drive wing trajectory to said first, second and third axis drive mechanisms, respectively.

15. The method of claim 14, wherein said desired drive wing trajectory is specified in real time by an automated trajectory specification system that generates said desired drive wing trajectory by comparing inputted actual and desired data that is selected from the group consisting of vehicle position, velocity, acceleration, orientation, rate of change of orientation, rate of change of rate of change of orientation, and combinations of two or more thereof.

16. A vehicle that derives motion from at least one wing-drive mechanism attached to a fuselage, said vehicle comprising a) a fuselage;

b) a drive wing having an adjustable pitch relative to said fuselage and being moveable relative to said fuselage about yaw and flap axes;

c) a first axis drive mechanism for moving said drive wing about said flap axis in response to a first movement input signal;

d) a second axis drive mechanism for moving said drive wing about said yaw axis in response to a second movement input signal, wherein said second axis drive mechanism operates independently of said first axis drive mechanism; and e) a third axis drive mechanism for adjusting the pitch of said drive wing in response to a third movement input signal, wherein said third axis drive mechanism operates independently of said first and second axis drive mechanisms, wherein at least one of said axis drive mechanism includes a mass balance that allows said axis drive mechanism to work against reduced mass inertial forces.

17. The vehicle of claim 16, wherein said drive wing is affixed to a spar that is coupled to said third axis drive mechanism through a joint such that torque generated by said third axis drive mechanism is transferred to said spar through said joint to affect changes in pitch of said drive wing, said joint being such that said spar is capable of independent movement about yaw and flap axes.

18. The wing-drive mechanism of claim 17, wherein said spar is inserted through a slot of a first slotted arc in said first axis drive mechanism, said first slotted arc being rotatable about said flap axis, such that rotation of said first slotted arc about said flap axis imparts a flap motion to said drive wing, and said first slotted arc is affixed to a mass balance that allows first said axis drive mechanism to work against reduced mass inertial forces.

19. The vehicle of claim 18 that has at least two of said wing-drive mechanisms in opposing positions relative to the fuselage.

20. The vehicle of claim 19, wherein the first, second and third movement input signals for each wing-drive are generated by one or more controllers that that calculates said first, second and third movement input signals in real time using a controlling function that relates a desired drive wing trajectory and an actual drive wing trajectory to torques to be applied by each of said first, second and third axis drive mechanisms, and the controller or controllers can generate movement input signals for at least one drive wing that have an arbitrary relationship to movement input signals generated by the controller or controllers for at least one other drive wing.

21. The vehicle of claim 20 wherein said desired drive wing trajectories for each drive wing are generated by an automated trajectory specification system that generates said desired drive wing trajectory by comparing inputted actual and desired data that is selected from the group consisting of vehicle position, velocity, acceleration, orientation, rate of change of orientation, rate of change of rate of change of orientation and combinations of two or more thereof.

22. The method of claim 8, wherein the vehicle is a flying vehicle that is adapted to engage in two or more states of trimmed equilibrium flight, and has at least two wing-drive mechanisms.

23. The method of claim 22, wherein for at least one of said states of trimmed equilibrium flight, a set of trajectories is developed for the drive wings of the wing-drive mechanisms, that will cause the flying vehicle to attain or approximate that trimmable state, and said set of trajectories are inputted to the controllers of the drive wing mechanisms in step a) as desired drive wing trajectories.

24. The method of claim 23, wherein the flying vehicle is an ornithopter having states of trimmed equilibrium flight selected from the group consisting of longitudinal, lateral, vertical, diagonal and glide.

25. The method of claim 23, wherein the flying vehicle has states of trimmed equilibrium flight selected from the group consisting of hover, longitudinal, lateral, vertical and diagonal.

26. The method of claim 23, wherein the flying vehicle has states of trimmed equilibrium flight selected from the group consisting of rolling, pitching and yawing.

* * * * *